US012706292B2

United States Patent

(12) United States Patent
Silveira et al.
(10) Patent No.: US 12,706,292 B2
(45) Date of Patent: Aug. 11, 2026

(54) APPARATUS AND METHOD FOR ION SEPARATION

(71) Applicant: Thermo Finnigan LLC, San Jose, CA (US)

(72) Inventors: Joshua Silveira, Gilroy, CA (US); Michael Senko, Sunnyvale, CA (US); Pablo Nieto Ramos, Campbell, CA (US)

(73) Assignee: Thermo Finnigan LLC, San Jose, CA (US)

(*) Notice: Subject to any disclaimer, the term of this patent is extended or adjusted under 35 U.S.C. 154(b) by 413 days.

(21) Appl. No.: 18/090,730

(22) Filed: Dec. 29, 2022

(65) Prior Publication Data

US 2024/0222106 A1 Jul. 4, 2024

(51) Int. Cl.
*H01J 49/42* (2006.01)
*H01J 49/06* (2006.01)

(52) U.S. Cl.
CPC ........ *H01J 49/4225* (2013.01); *H01J 49/062* (2013.01)

(58) Field of Classification Search
CPC .... H01J 49/062; H01J 49/063; H01J 49/4225; H01J 49/4255; H01J 49/426; H01J 49/429
See application file for complete search history.

(56) References Cited

U.S. PATENT DOCUMENTS 7,227,138 B2 6/2007 Lee et al.
7,348,554 B2 3/2008 Hashimoto et al.
7,381,947 B2 6/2008 Senko
7,405,401 B2 7/2008 Hoyes
7,872,228 B1 1/2011 Kim et al.
8,581,177 B2 11/2013 Kovtoun
8,809,769 B2 8/2014 Park
9,111,741 B2 8/2015 Ding et al.
9,768,007 B2 9/2017 Verenchikov
10,256,088 B2 4/2019 Baba
10,651,025 B1 5/2020 Silveira et al.
2004/0222369 A1 11/2004 Makarov et al.
(Continued)

FOREIGN PATENT DOCUMENTS

CN 105869983 B * 4/2018 .............. H01J 49/02

OTHER PUBLICATIONS

Chernushevich, I. et al. "A W-geometry ortho-TOF MS with high resolution and up to 100% duty cycle for MS/MS." Journal of the American Society for Mass Spectrometry. Jul. 17, 2017;28(10):2143-50.

(Continued)

*Primary Examiner* — David E Smith

(57) ABSTRACT

Disclosed herein are systems and methods for sorting ions including a group of multipole electrodes configured to form an ion trap, and an ion guide adjacent to, and operably coupled to the group of multipole electrodes. Using a radio frequency (RF) or Direct Current (CD) power supply device the system can apply an RF voltage to the group of multipole electrodes thereby creating a pseudo-potential barrier. A DC gradient voltage may then be applied creating an axial field in opposition to the pseudo-potential barrier. As the DC voltage is raised and/or the RF voltage is lowered, one or more ions will be eluted through the barrier.

18 Claims, 22 Drawing Sheets

(56) References Cited

U.S. PATENT DOCUMENTS

| | | | | |
|---|---|---|---|---|
| 2005/0029445 | A1 | 2/2005 | Lee et al. | |
| 2008/0156984 | A1 | 7/2008 | Makarov et al. | |
| 2011/0057097 | A1* | 3/2011 | Bateman | H01J 49/424 250/296 |
| 2012/0267523 | A1* | 10/2012 | Lammert | H01J 49/424 250/283 |
| 2013/0214149 | A1* | 8/2013 | Giles | H01J 49/062 250/281 |
| 2015/0048246 | A1* | 2/2015 | Green | H01J 49/36 250/294 |

OTHER PUBLICATIONS

EP23215747.9, Extended European Search Report, May 31, 2024, 13 pages.

Hettikankanange P.M., et al., "Varying the Aspect Ratio of Toroidal Ion Traps: Implications for Design, Performance, and Miniaturization," Dec. 7, 2020, XP055920559, 78 pages.

March R.E., et al., "Quadrupole Ion Trap Mass Spectrometry", Second Edition, Chapter 5, "Linear Quadrupole Ion Trap Mass Spectrometry," Wiley-Interscience, 2005, XP055214936, pp. 161-187.

* cited by examiner

1211

| Parameter | Value |
|---|---|
| Front of Trap, start of scan | 220 V |
| Back of Trap, start of scan | 210 V |
| DC Ramp Time | 10 ms |
| Front of Trap, end of scan | 260 V |
| Back of Trap, end of scan | 210 V |
| Frequency | 1 MHz |
| RF Amplitude in Trap | 180 Vpp |
| Entrance of Funnel | 200 V |

1212 1213

1221

| Parameter | Value |
|---|---|
| Front of Trap, start of scan | 220 V |
| Back of Trap, start of scan | 210 V |
| DC Ramp Time 1223 | 10 ms |
| RF Amplitude in Trap, start of scan | 180 Vpp 1222 |
| RF Amplitude in Trap, end of scan | 0 Vpp |
| Frequency | 1 MHz |
| Entrance of Funnel | 200 V |

| m/z | $K_0$ |
|---|---|
| 1222 | 0.713 |
| 923 | 1.035 |
| 922 | 0.828 |
| 921 | 0.621 |
| 622 | 1.01 |

| Parameter | Value |
|---|---|
| Front of Trap, start of scan | 220 V |
| Back of Trap, start of scan | 210 V |
| DC Ramp Time | 10 ms |
| Front of Trap, end of scan | 260 V |
| Back of Trap, end of scan | 210 V |
| Frequency | 1 MHz |
| RF Amplitude in Trap | 180 Vpp |
| Entrance of Funnel | 200 V |

APPARATUS AND METHOD FOR ION SEPARATION

FIELD

The present disclosure generally relates to the field of mass spectrometry including systems and methods for guiding and separating ions.

BACKGROUND

Examples of ion guides in mass spectrometry systems include atmospheric pressure interface transfer optics, multipoles to transfer ions between different analyzer sections, HCD and CID collision cells, and some others. Stacked ring ion guides are well known and comprise a plurality of ring electrodes each having an aperture through which ions are transmitted. The ion confining region of conventional stacked ring ion guides is circular in cross section. Only ions of a certain mass-to-charge ratio will be able to pass through an ion trap and reach the detector for a given ratio of voltages. This permits selection of an ion with a particular m/z or allows the operator to scan for a range of m/z-values by continuously varying the applied DC and RF voltages.

Problems in the prior art include RF voltage necessitating bigger and more expensive power supplies. Additionally, higher voltage can create conditions within the ion guide that lead to instability of small ions, and, as an example, product ions that may be formed inside a collision cell. Too high RF voltage can also present transmission issues at the interface with other ion optics elements.

The limited space charge capacity of conventional ion traps and ion guides can result in a loss of transmission or sensitivity due to inefficient ion confinement which leads to ion losses. Furthermore, conventional ion traps and ion guides may suffer from loss of analytical performance when used as an ion mobility separator or mass to charge ratio separator at elevated pressures. This is characterized by loss of resolution or separation power and/or by unexpected shifts in ejection times. These shifts lead to inaccuracy of analytical measurements. It is therefore desired to provide an improved ion guide.

SUMMARY

In a first aspect, a system for sorting ions is provided that has a group of multipole electrodes configured to form an ion trap, and an ion guide adjacent to the group of multipole electrodes. An RF and DC voltage device is then used to apply an RF voltage to the group of multipole electrodes thereby creating a pseudo-potential barrier configured to confine one or more ions. The RF and DC voltage device is also used to apply a DC voltage that creates an axial field in opposition to the pseudo-potential barrier at the exit of the trap. The RF voltage or DC voltage is then ramped up or down, depending on the use case to cause at least one ion to be eluted across the pseudo-potential barrier.

In a second aspect, a method for sorting ions is provided including applying, using an RF and DC voltage device, an RF voltage to a group of multipole electrodes creating a pseudo-potential barrier; and applying, using the RF and DC voltage device, a DC voltage creating an axial field in opposition to the pseudo-potential barrier, wherein the pseudo-potential barrier is configured to confine one or more ions. The RF voltage or DC voltage is then ramped up or down, depending on the use case to cause at least one ion to be eluted across the pseudo-potential barrier.

DRAWINGS

Embodiments will be readily understood by the following detailed description in conjunction with the accompanying drawings. To facilitate this description, like reference numerals designate like structural elements. Embodiments are illustrated by way of example, not by way of limitation, in the figures of the accompanying drawings.

FIG. 1 provides a block diagram of an exemplary mass spectrometry system, in accordance with various embodiments.

FIGS. 2A and 2B provide two example perspective renders of an ion trap and an ion guide, in accordance with various embodiments.

FIG. 3 provides a YZ cross-sectional cut-away view of an example ion trap, in accordance with various embodiments.

FIG. 4A provides an additional a XZ cross-sectional cut-away view of an example ion trap, in accordance with various embodiments.

FIG. 4B provides an additional a cross-sectional cut-away view of an example ion trap, in accordance with various embodiments.

FIG. 5A provides an example illustration of axial ion insertion into an ion trap, in accordance with various embodiments.

FIG. 5B provides an example illustration of orthogonal ion insertion into an ion trap, in accordance with various embodiments.

FIG. 5C provides another example illustration of orthogonal ion insertion into an ion trap, in accordance with various embodiments.

FIG. 5D provides another example illustration of orthogonal ion insertion into an ion trap, in accordance with various embodiments.

FIGS. 6A through 6E provide a series of illustrative diagrams that show elution methods, in accordance with various embodiments.

FIG. 7 provides an example graph of Elution Voltages vs. Elution Time and an example rendering of ion elution paths, in accordance with various embodiments.

Figure 11:
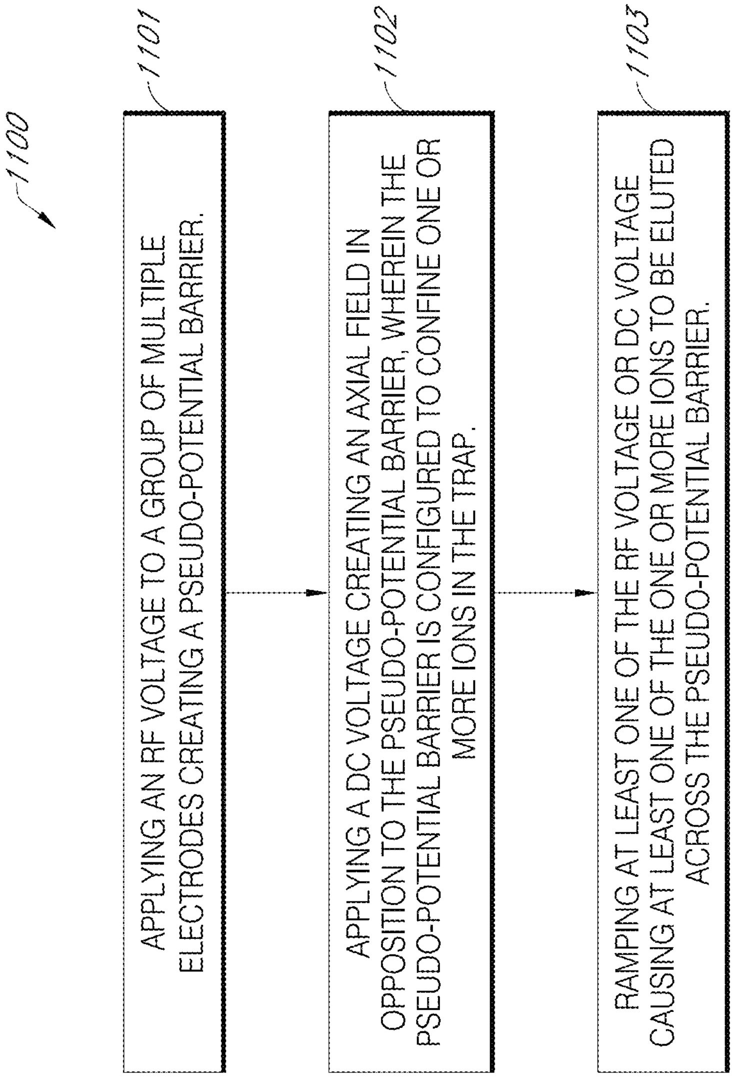

FIG. 11 provides a flow diagram of an example method of ion separation, in accordance with various embodiments.

Figure 12A:
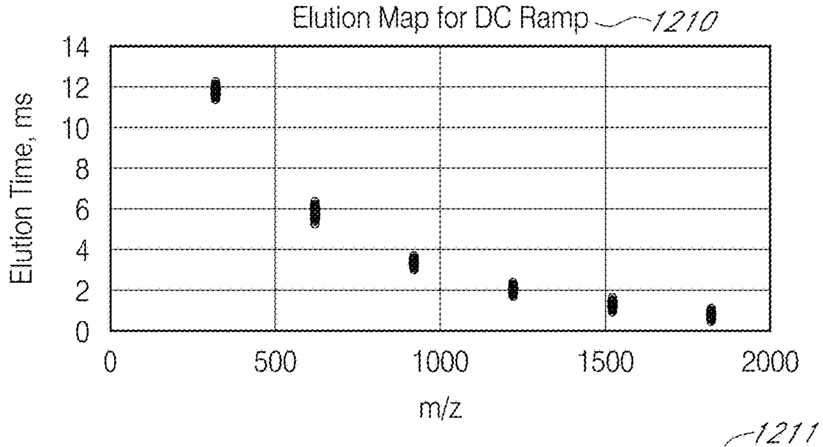
Figure 12B:
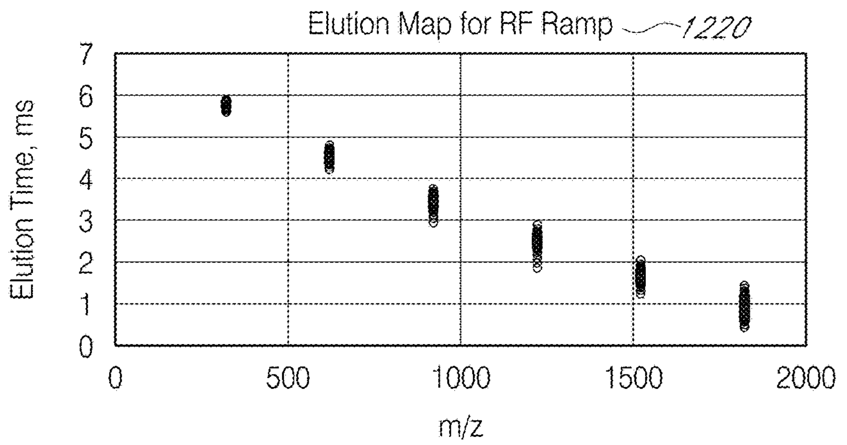

FIGS. 12A and 12B shows examples of elution time plots for DC and RF Ramp, in accordance with various embodiments.

Figure 13:
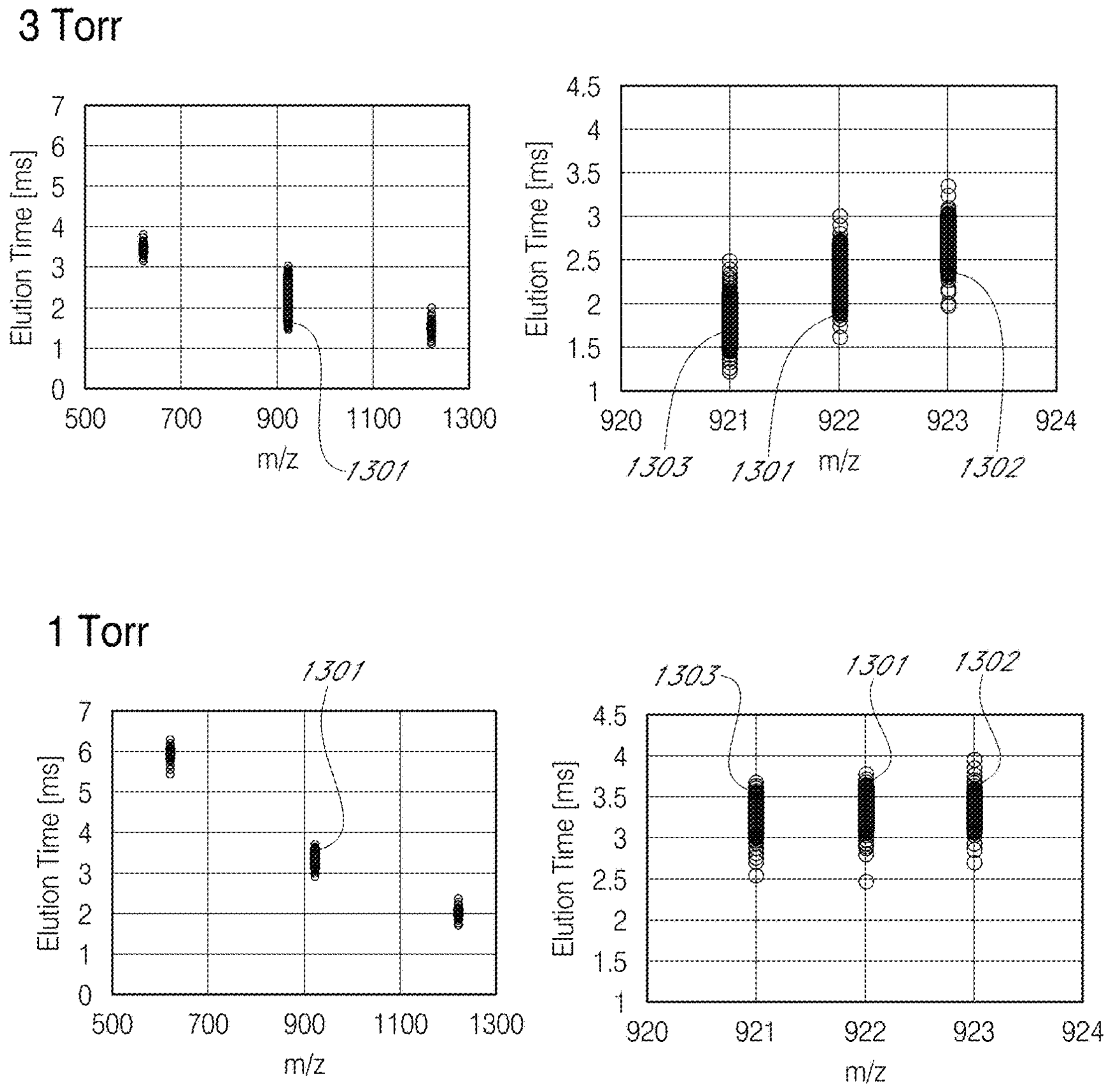

FIG. 13 shows examples of elution time plots for 1 Torr and 3 Torr, in accordance with various embodiments.

Figure 14:
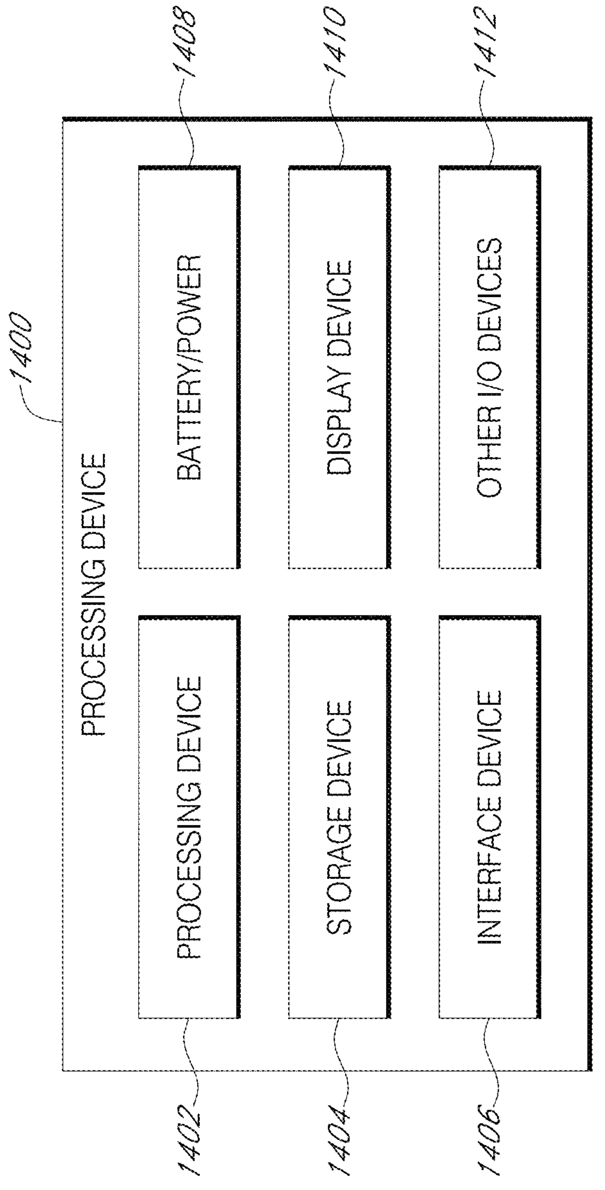

FIG. 14 provides is a block diagram of an example computing device that may perform some or all of the mass spectrometer support methods disclosed herein, in accordance with various embodiments.

Figure 15:
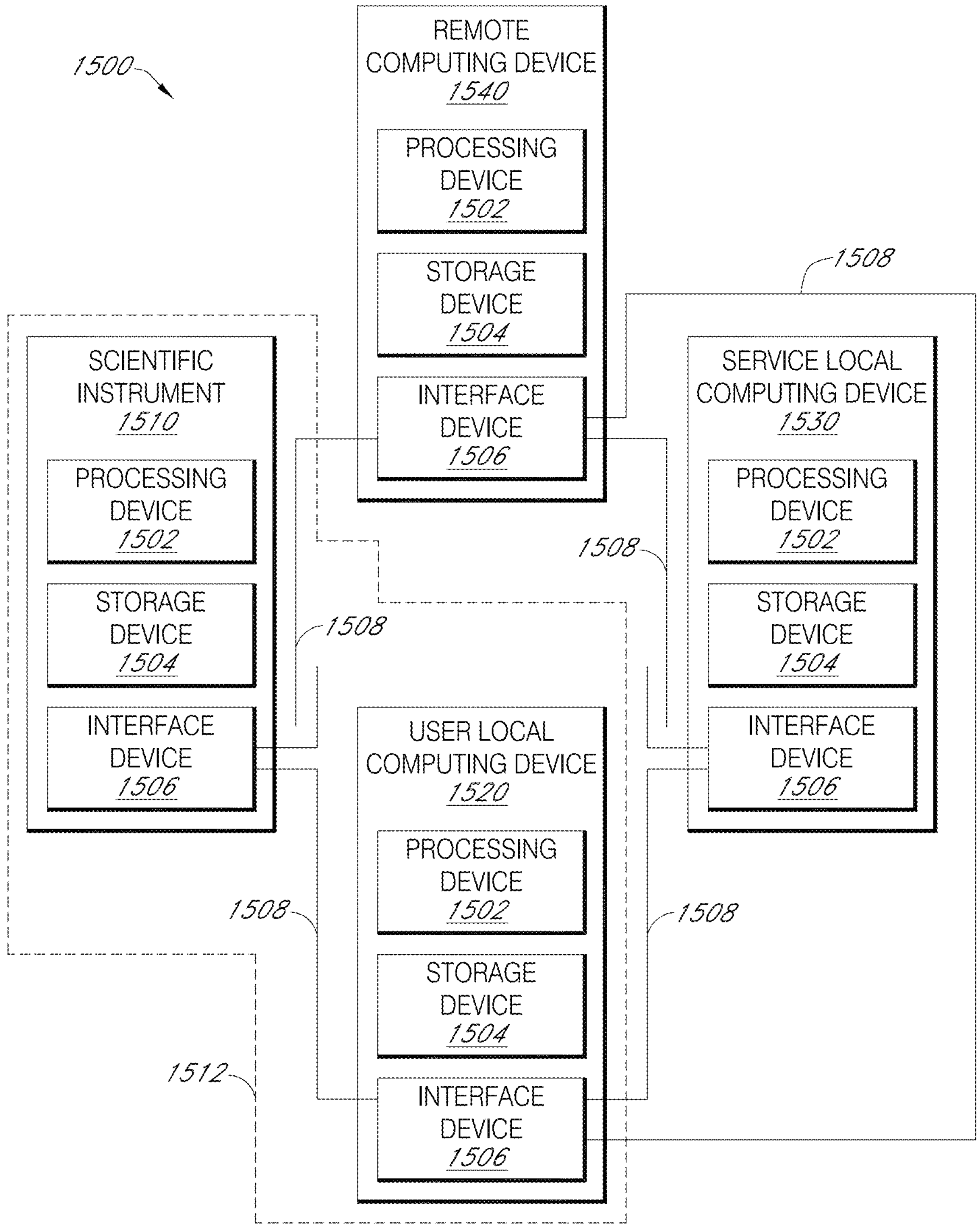

FIG. 15 provides a block diagram of an example mass spectrometer support system in which some or all of the mass spectrometer support methods disclosed herein may be performed, in accordance with various embodiments.

DETAILED DESCRIPTION

Disclosed herein are mass spectrometry systems, as well as related methods, computing devices, and computer-readable media. The section headings used herein are for organizational purposes only and are not to be construed as limiting the described subject matter in any way.

In this detailed description of the various embodiments, for purposes of explanation, numerous specific details are set forth to provide a thorough understanding of the embodiments disclosed. One skilled in the art will appreciate, however, that these various embodiments may be practiced with or without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of the various embodiments disclosed herein.

In the following detailed description, reference is made to the accompanying drawings that form a part hereof wherein like numerals designate like parts throughout, and in which is shown, by way of illustration, embodiments that may be practiced. It is to be understood that other embodiments may be utilized, and structural or logical changes may be made, without departing from the scope of the present disclosure. Therefore, the following detailed description is not to be taken in a limiting sense.

Various operations may be described as multiple discrete actions or operations in turn, in a manner that is most helpful in understanding the subject matter disclosed herein. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments.

For the purposes of the present disclosure, the phrases "A and/or B" and "A or B" mean (A), (B), or (A and B). For the purposes of the present disclosure, the phrases "A, B, and/or C" and "A, B, or C" mean (A), (B), (C), (A and B), (A and C), (B and C), or (A, B, and C). As used herein, "a" or "an" also may refer to "at least one" or "one or more." As used herein, and as commonly used in the art of mass spectrometry, the term "DC" does not specifically refer to or necessarily imply the flow of an electric current but, instead, refers to a non-oscillatory voltage which may be either constant or variable. The term "RF" refers to an oscillatory voltage or oscillatory voltage waveform for which the frequency of oscillation is in the radio-frequency range. Although some elements may be referred to in the singular (e.g., "a processing device"), any appropriate elements may be represented by multiple instances of that element, and vice versa. For example, a set of operations described as performed by a processing device may be implemented with different ones of the operations performed by different processing devices.

The description uses the phrases "an embodiment," "various embodiments," and "some embodiments," each of which may refer to one or more of the same or different embodiments. Furthermore, the terms "comprising," "including," "having," and the like, as used with respect to embodiments of the present disclosure, are synonymous. When used to describe a range of dimensions, the phrase "between X and Y" represents a range that includes X and Y. As used herein, an "apparatus" may refer to any individual device or collection of devices. The drawings are not necessarily to scale.

I. Mass Spectrometry and Ion Traps

Figure 1:
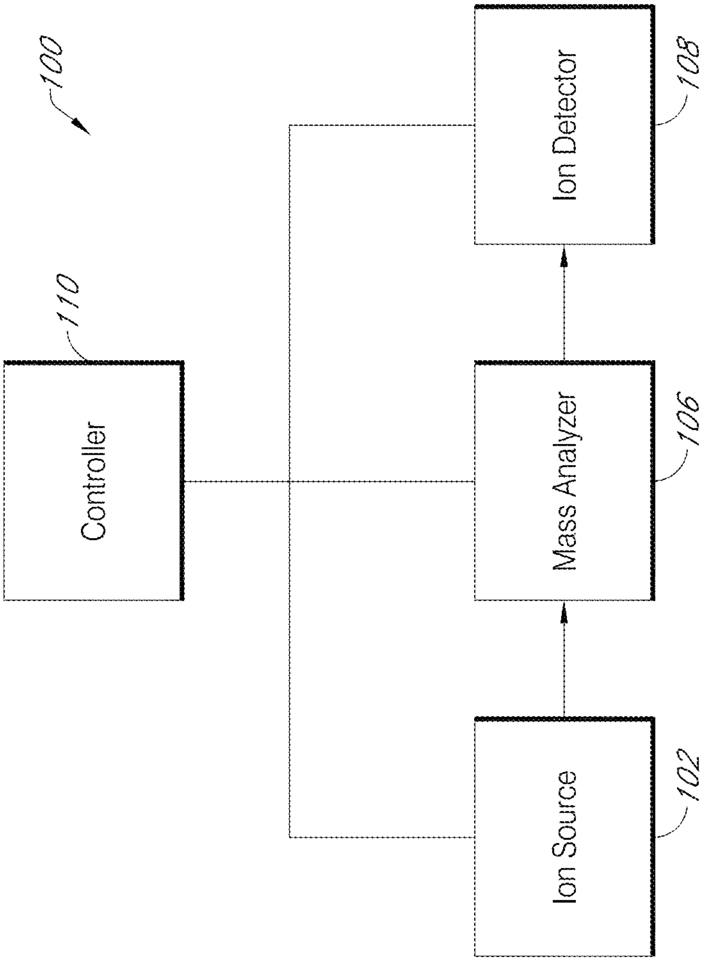

Various embodiments of mass spectrometer platform 100 can include components as displayed in the block diagram of FIG. 1. In an embodiment, elements of FIG. 1 may be incorporated into mass spectrometer platform 100. According to various embodiments, mass spectrometer platform 100 can include an ion source 102, a mass analyzer 106, an ion detector 108, and a controller 110. In some embodiments, and as discussed herein, the ion source 102 generates a plurality of ions from a sample. The ion source can include, but is not limited to, electron ionization (EI) sources, chemical ionization (CI) sources, electrospray ionization (ESI) sources, atmospheric pressure chemical ionization (APCI) sources, matrix assisted laser desorption ionization (MALDI) sources, and the like.

In a further embodiment, the mass analyzer 106 may separate ions based on a mass-to-charge ratio of the ions and/or the ion mobility. By way of non-limiting example, mass analyzer 106 may include a mass filter analyzer, an ion trap analyzer, a time-of-flight (TOF) analyzer, an electrostatic trap (e.g., Orbitrap) mass analyzer, Fourier transform ion cyclotron resonance (FT-ICR) mass analyzer, and the like. In some embodiments, the mass analyzer 106 can also be configured to fragment the ions using collision induced dissociation (CID) electron transfer dissociation (ETD), electron capture dissociation (ECD), photo induced dissociation (PID), surface induced dissociation (SID), and the like, and further separate the fragmented ions based on the mass-to-charge ratio. The mass analyzer 106 may also be a hybrid system incorporating one or more mass analyzers and mass separators coupled by various combinations of ion optics and storage devices. For example, a hybrid system may have a linear ion trap (LIT), a high energy collision dissociation device (HCD), an ion transport system, and a TOF.

In various embodiments, the ion detector 108 can detect ions. For example, the ion detector 108 may include an electron multiplier, a Faraday cup, or the like. In some embodiments, the ion detector may be quantitative, such that an accurate count of the ions can be determined. In other embodiments, such as with an electrostatic trap mass analyzer, the mass analyzer detects the ions, combining the properties of both the mass analyzer 106 and the ion detector 108 into one device.

In some embodiments, and as shown, the controller 110 may communicate with the ion source 102, the mass analyzer 106, and the ion detector 108. For example, controller 110 may configure the ion source 102 or enable/disable the ion source based on various factors. In an additional embodiment, the controller 110 may configure the mass analyzer 106 to select a particular mass range to detect. Further, the controller 110 can adjust the sensitivity of the ion detector 108, such as by adjusting the gain. Additionally, the controller 110 can adjust the polarity of the ion detector 108 based on the polarity of the ions being detected. For example, the ion detector 108 can be configured to detect positive ions or be configured to detect negative ions.

Examples of computing devices that may, singularly or in combination, implement the mass spectrometer platform 100 are discussed herein with reference to the computing device 1400 of FIG. 14, and examples of systems of interconnected computing devices, in which the mass spectrometer platform 100 may be implemented across one or more of the computing devices, is discussed herein with reference to the mass spectrometry support system 1500 of FIG. 15.

Quadrupole mass spectrometers traditionally generate mass spectra by using a nearly constant RF/DC ratio whose RF and DC amplitudes are nearly linearly scaled in time.

This process, as would be understood by one of ordinary skill in the art, essentially produces a shifting pass-band filter where different ranges of mass-to-charge (m/z) ions are stable and allowed to pass through and into a detector. This passband can be defined by the a and q values that are solutions to the Mathieu equation.

As would be understood by one of ordinary skill in the art, in the current state of the art, quadrupoles and ion traps are routinely used for ion selection during a mass spectrometry session. Ion traps allow for a large number of ions, with varying mass and charge, to be injected into the system. The injected ions are generally contained in an ion trap (e.g., trapped inside a ring-shaped quadrupolar potential). The ions can then be selectively released as the RF voltage of the trap is ramped down, or as the DC voltage, which creates an axial field, is ramped up. It should further be understood that the ions can be selected for elution based on a mass-to-charge (m/z) ratio and/or an ion mobility factor. The mass-to-charge ratio of an ion is simply the mass of the atom divided by its charge and is generally expressed in kilogram (kg) per coulombs (C) or Dalton (Da) per elementary charge (e). Alternatively, ion mobility is determined based on the average speed (e.g., velocity) that a specific ion passes through a known gas, while under the influence of an electric field, and is generally expressed in meters per second per volt per meter $$\left(\frac{\text{m/s}}{\text{V/m}} \text{ or } \left(\text{ms}^{-1}\left(\text{V/m}^{-1}\right)^{-1}\right)\right).$$

II. Ion Trap Configuration and Metrics

Figure 2A:
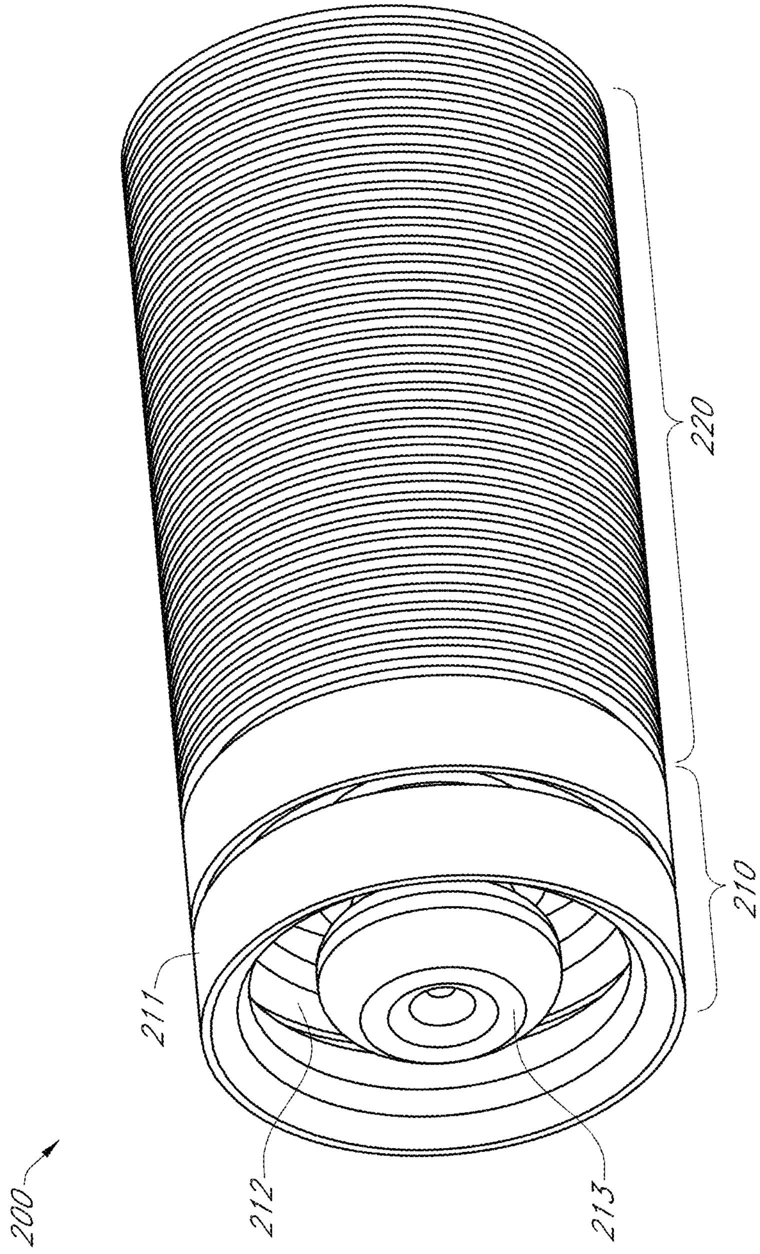
Figure 2B:
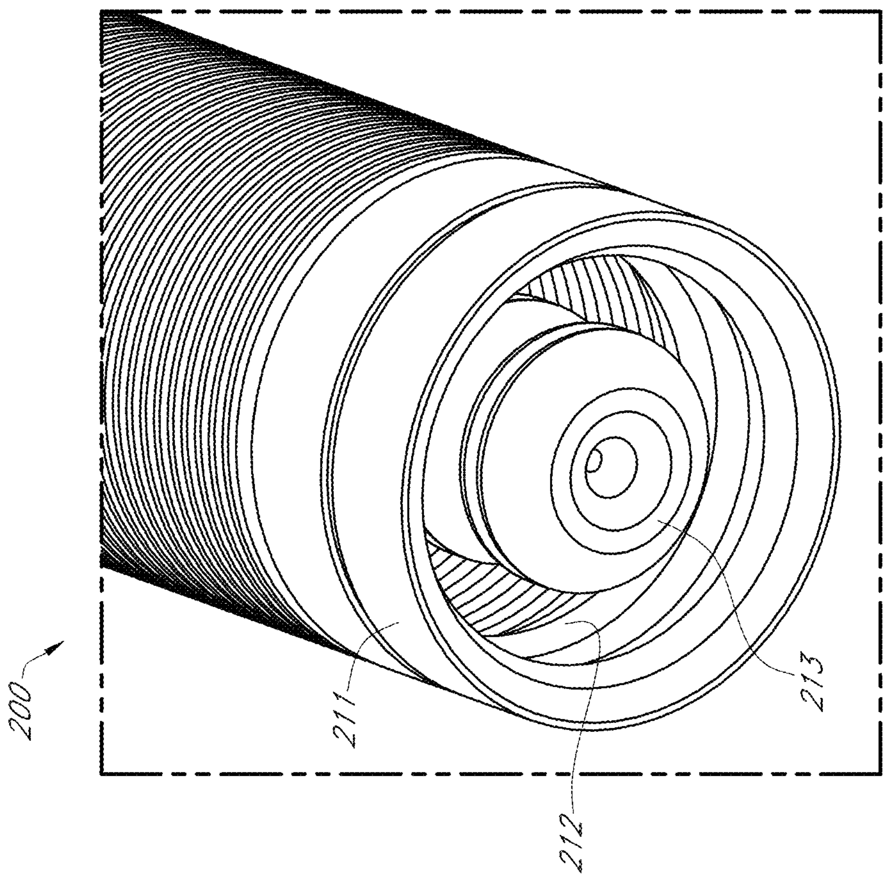

Referring now to FIGS. 2A and 2B, two example views of an ion trap 210 and an ion funnel 220 are shown. It should be understood that although the figures and description herein generally refer to an "ion funnel," that it is only one embodiment of an ion guide device. Thus, for the purpose of this disclosure, any reference to an ion funnel (or representation of an ion funnel, e.g., FIGS. 4A and 4B) should be understood to be for explanatory purpose only, and that any type of ion guide may be used, such as, for example, a stacked ring guide, an ion funnel, a multipole, or the like. In some embodiments, and as shown, the ion trap 210 may have an outer electrode 211 in the shape of a ring, having an internal circular aperture, or opening, 212 to trap the ions. The ion trap 210 may also have an inner electrode 213 disposed within the circular aperture 212. Accordingly, in some embodiments, the region or volume 212 between the inner electrode 213 and the outer electrode 211 operates as an ion trap. Various alternative embodiments may exist in which the multipole electrodes comprise a group of electrodes (e.g., hexapole or higher order multipoles) configured to provide a potential.

Figure 3:
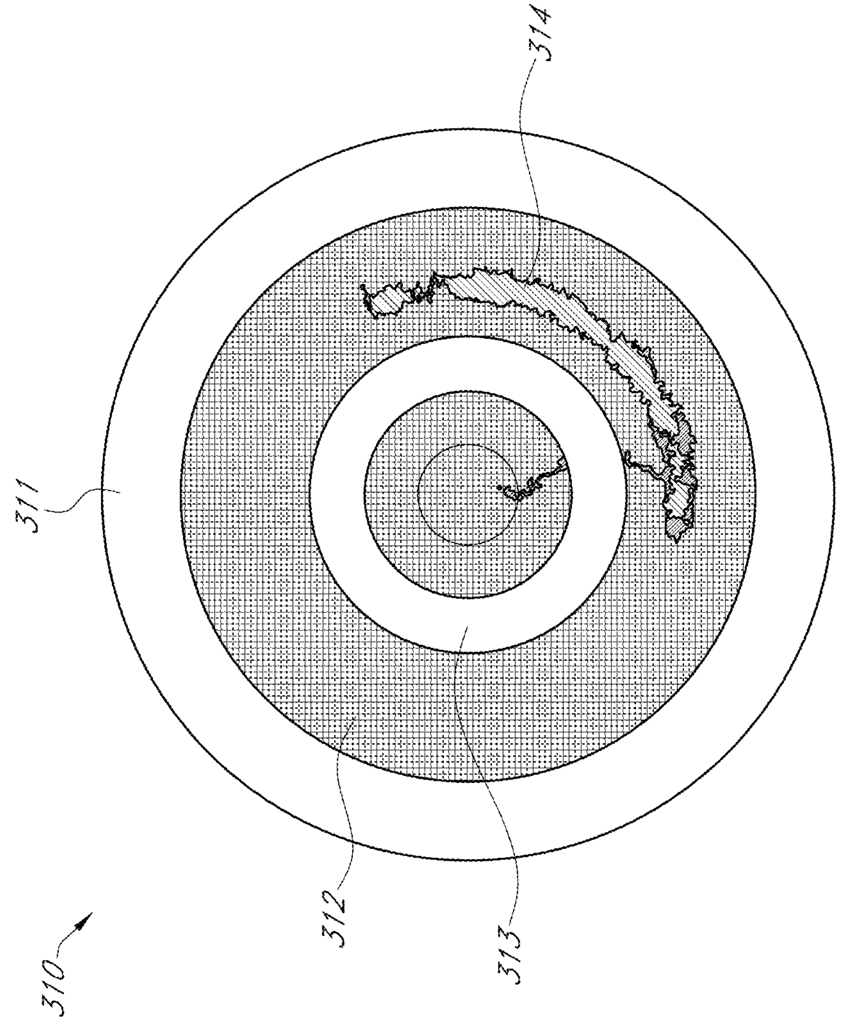

Referring briefly to FIG. 3, a YZ cross-sectional cut-away view of the example ion trap 310 is shown. In some embodiments, and as discussed herein, the ion trap 310 can have an outer electrode 311 and an inner electrode 313, separated by a region or volume 312. As ions 314 are injected into the ion trap 310, they are free to occupy the open area 312, and will generally form an annulus, as shown. Stated differently, the ions 314 are substantially unconfined or unrestrained in a tangential direction, which is orthogonal both to a radial direction and to a longitudinal axis of the ion trap 310 or ion funnel (e.g., 220 from FIGS. 2 and 420 from FIG. 4).

Figure 4A:
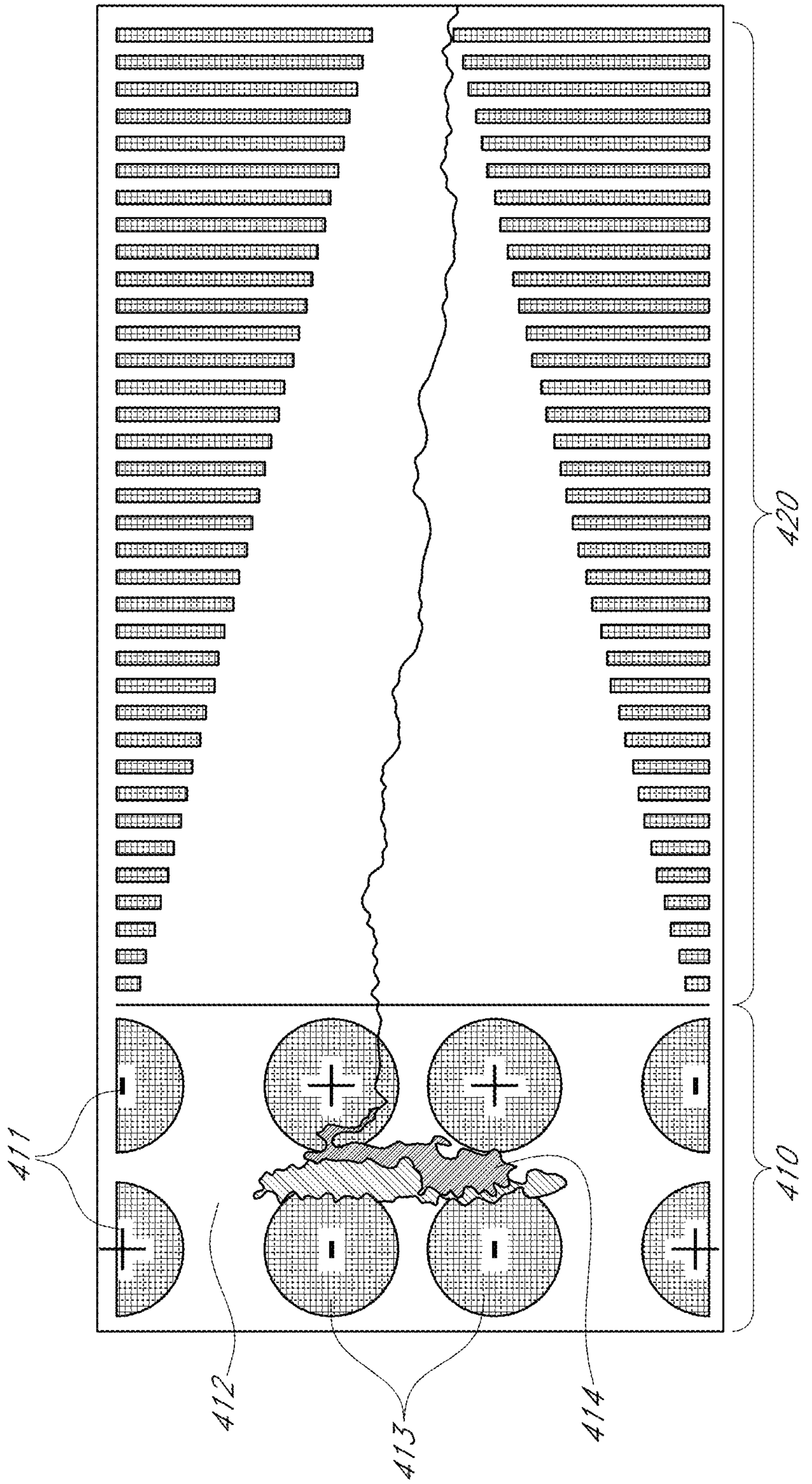
Figure 4B:
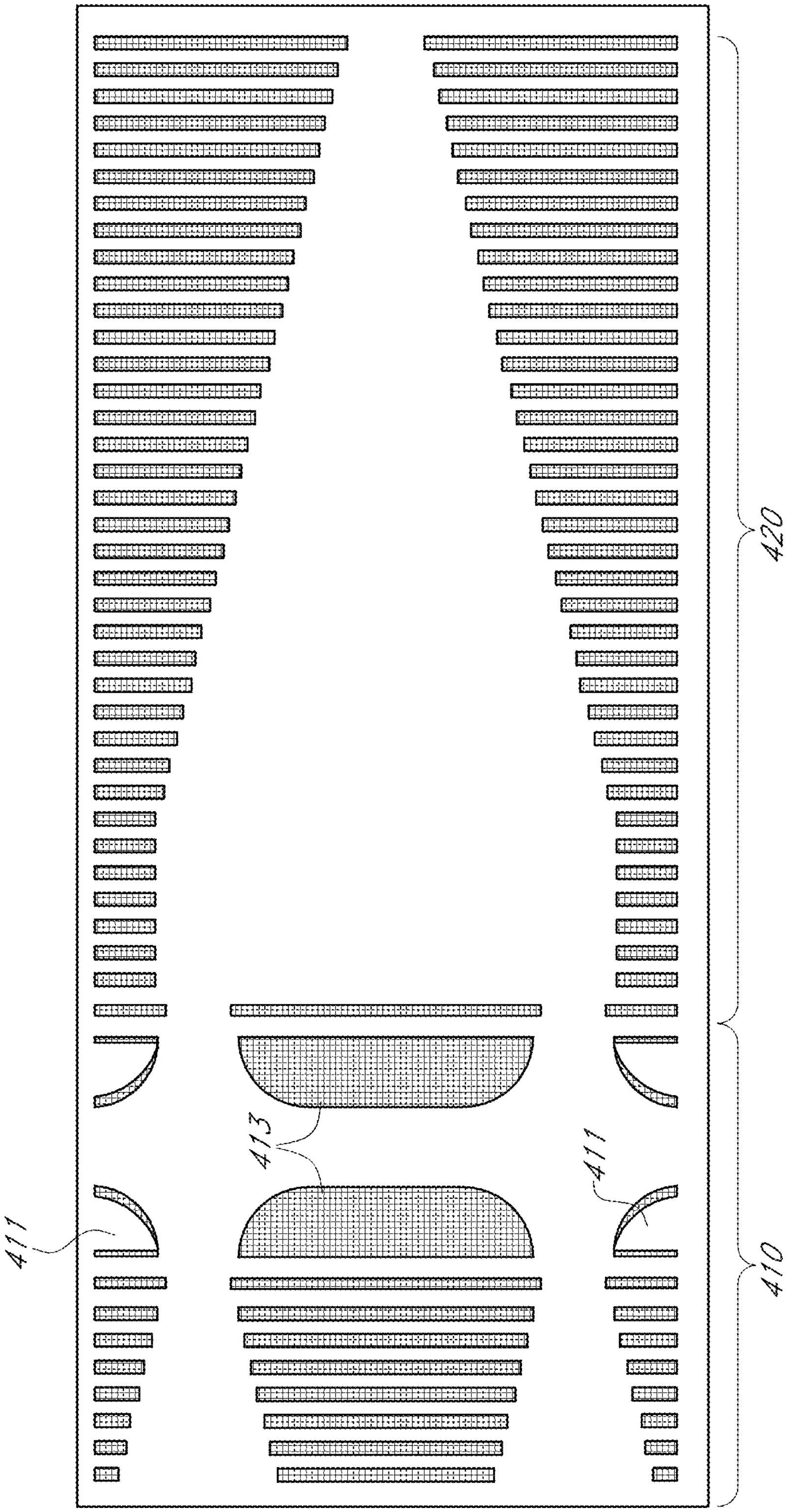

Referring briefly to FIGS. 4A and 4B, two alternative XZ cross-sectional cut-away views are shown of the ion trap 410 and ion funnel 420. Accordingly, in some embodiments, and as shown, the ions 414 will gather in the open region 412 forming an intermediate ring or annulus between the outer electrode 411 and the inner electrode 413. Stated differently, the inner electrodes 413, which are generally concentric with the outer electrodes 411 and define the annular ion guiding region 412, in which ions may be confined.

In some embodiments, an alternating current (AC) or radio frequency (RF) signal generator, or power supply, may be connected to the outer electrode 211/311/411 and the inner electrode 213/313/413 in opposite phases (e.g., +RF connected to inner electrode and −RF connected to the outer electrode or vice versa). Accordingly, because opposing RF power is applied to the outer electrode 211/311/411 and the inner electrode 213/313/413 a radially confining pseudo-potential electrical field is generated, which, according to some embodiments, acts as a barrier (e.g., a pseudo-potential barrier) to confine the ions within the ion region 212/312/412. As best shown in FIGS. 3 and 4B, and discussed in greater detail herein, in some embodiments, ions 314/414 may be pushed across the pseudopotential barrier and subsequently driven along the axial length of the ion funnel 220/420 by applying by applying a static Direct Current (DC) electric field to create an axial field in opposition of the pseudo-potential barrier separating the trap and the next adjacent lens element.

In some embodiments, the ion trap 210/310/410 and ion funnel 220/420 may be filled with a buffer gas. As would be understood by one of ordinary skill in the art, the buffer gas may assist the ions to stabilizing ion motion within the ion region 212/312/412, while also serving as a collision gas for collision-induced dissociation (CID). In a further embodiment, the gas may be pumped or forced into the ion region 212/312/412 at pressures between ~5 Torr and ~1 mTorr.

III. Ion Trap Functionality

Figure 5B:
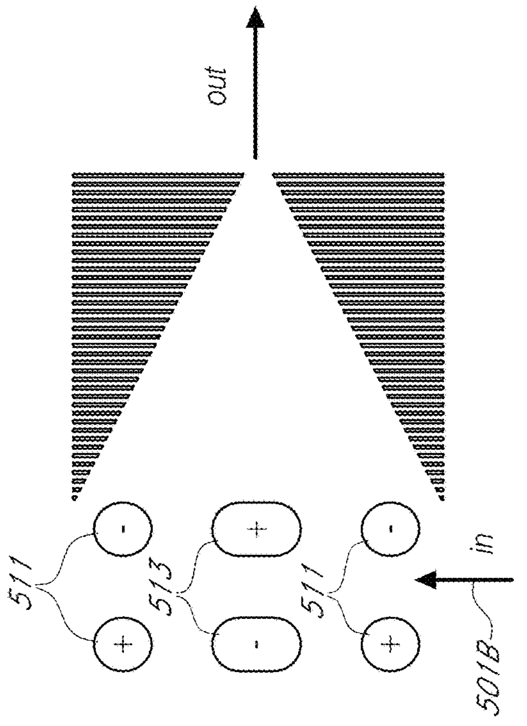
Figure 5A:
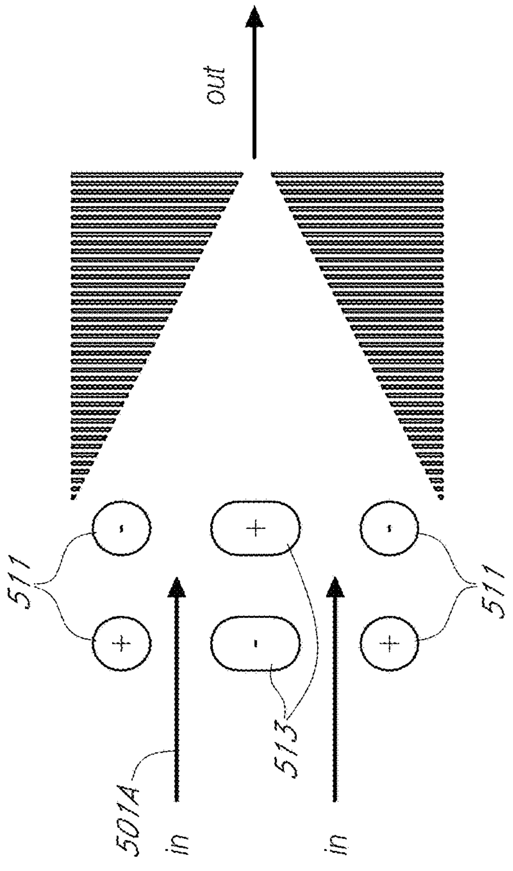

In some embodiments, the analysis scheme begins by inserting ions into an ion trap 210/310/410. As shown in FIGS. 5A and 5B, ions may be inserted axially (e.g., 501A in FIG. 5A) or orthogonally (e.g., 501B in FIG. 5B). In some embodiments, it may be beneficial to insert, or inject, the ions orthogonally 501B. Similar to the ions that are injected axially 501A, orthogonally injected ions 501B are also forced to cross, or pass through, a pseudopotential barrier created by the outer 511 and inner 513 electrodes, as discussed herein. Generally, during axial injection the front electrodes of the trap are maintained at a lower RF voltage than the back electrodes. In this embodiment, the radial symmetry of the trap is not broken and thus all ions see the same potential irrespective of their elution position.

Figure 5D:
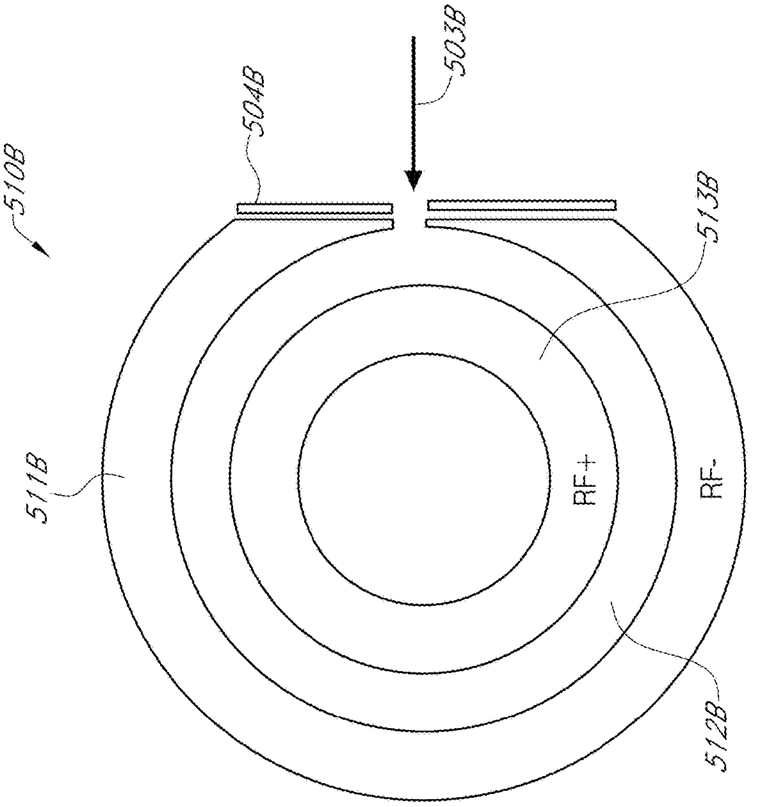
Figure 5C:
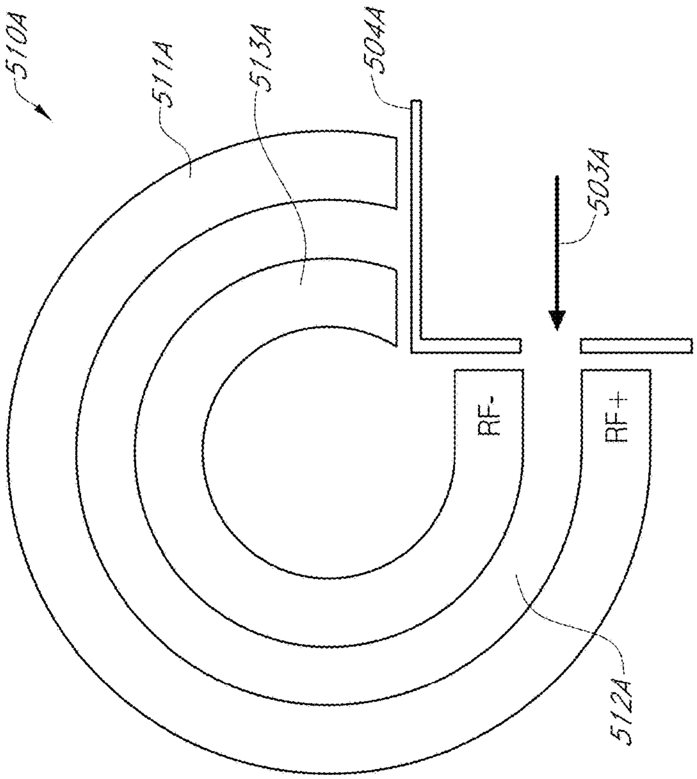
Figure 6A:
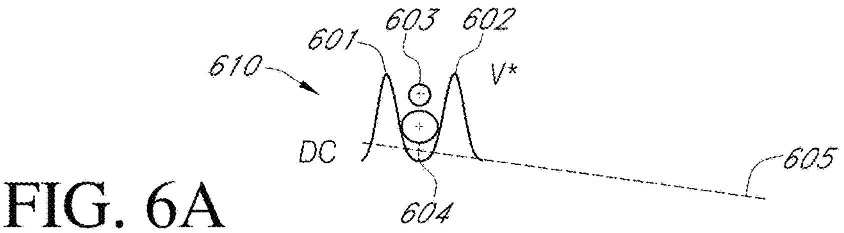
Figure 6B:
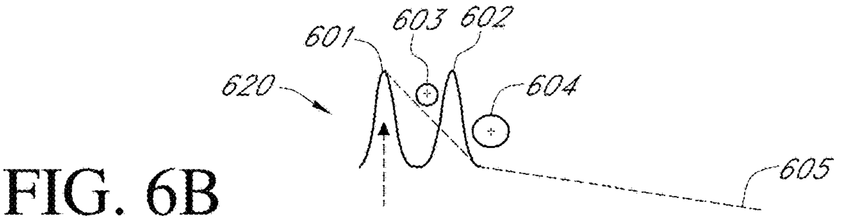
Figure 6C:
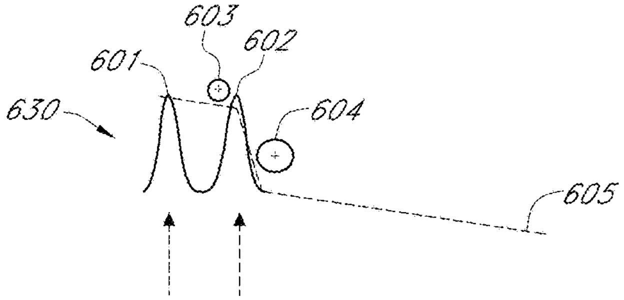
Figure 6D:
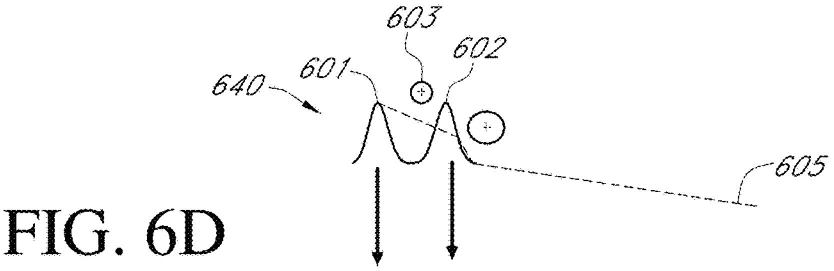
Figure 6E:
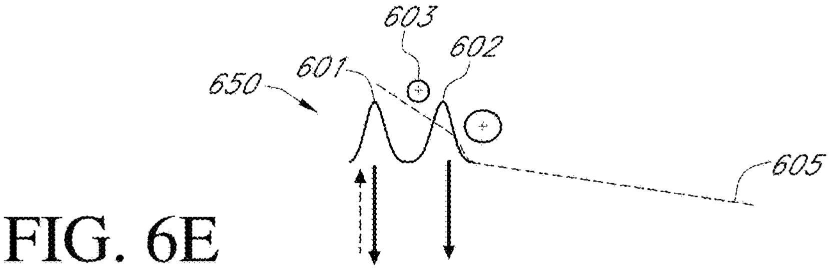

As discussed herein, ions may be injected into the ion traps 210/310/410 axially and/or orthogonally. Referring now to FIGS. 5C and 5D, example illustrations of orthogonal injection are shown. In some embodiments, and as shown, the ion traps 510A and 510B, similar to ion trap 310 of FIG. 3, have an outer electrode 511A/511B and an inner electrode 513A/513B (creating a space therebetween 512A/512B) that are charged in opposite phases (e.g., +RF connected to inner electrode and −RF connected to the outer electrode (e.g., FIG. 5D) or vice versa (e.g., FIG. 5C)). In some embodiments, ions may be inserted 503A/503B across a pseudo potential barrier created by one or more DC electrodes 504A/504B. As discussed herein, and shown in FIG. 3, as the ions are orthogonally injected 503A/503B they may form an annulus in the open area 512A/512B.

RF fields may be established such that a quadrupolar or predominantly quadrupolar potential is present in the center of the ion trap 210/310/410. The pseudopotential well depth (i.e., the $V_{trap}$ value) of an ion trap 210/310/410 in one embodiment may be inversely proportional to mass-to-charge ratio of an ion and proportional to the amplitude of the RF voltage (i.e., the $V_{RF}$ value) squared. The $V_{trap}$ value may be obtained using Equation 1:

$$V_{trap} = CeV_{RF}^2/(\omega^2 m/z)$$

where e is the elementary charge, Cis a geometric constant, and ω is the RF frequency.

According to Equation 1, an ion with a high m/z ratio will experience a lower overall $V_{trap}$ barrier, and consequently, should be the first ion species to elute when using one of the disclosed methods. In some embodiments, and as discussed herein, placing a DC gradient within the ion trap 210/310/410 may provide an additional benefit by facilitating axial stratification according to the well depth prior to elution across one of the pseudo-potential barriers. This is possible because the applied DC field is not being used to contain the ions and is completely independent of the mass-to-charge ratio. Alternatively, the $V_{trap}$ value is dependent on the mass-to-charge (m/z) ratio, as shown by Equation 1.

Referring now to FIGS. 6A through 6E, a series of illustrative diagrams are show. The diagrams shown represent the rear pseudo-potential barrier 601, the front pseudo-potential barrier 602, a low mass ion 603, a high mass ion 604 and the DC gradient voltage 605. In some embodiments, and as represented by the first diagram 610, a plurality of ions (e.g., 603 and 604) are inserted into the ion trap 210/310/410 (e.g., such as shown in FIGS. 5A and 5B). As discussed herein, as ions 314 are injected into the ion trap 310, they are free to occupy the open area 312, and will generally form an annulus.

In some embodiments, once the ions (e.g., 603/604) are trapped within the pseudo-potential barriers (e.g., 601/602) they will remain in a pseudo-equilibrium, trapped between the barriers. Elution of the ions 603/604 may be accomplished in a number of ways. A non-limiting list of examples may include: (1) ramping down the RF voltage, (2) forcing ions over a stationary pseudopotential barrier by ramping up the DC gradient inside the trap, (3) floating the entire trap up with respect to the adjacent ion guide, or (4) various combinations of strategies 1-3. As shown in FIG. 6, the arrows are intended to convey which voltage is being ramped with time, and in what direction. For example, in diagram 610, there are no arrows because nothing is being ramped. In diagram 620, the DC voltage 605 on the trap entrance is being ramped up; in diagram 630, the DC voltage 605 on the trap entrance and exit is ramped up; in diagram 640, the RF voltage 601/602 is ramped down; and in diagram 650, the RF voltage is ramped down, while the DC voltage is ramped up.

In some embodiments, and as shown in diagram 620, the DC gradient voltage 605 may be slightly increased within the ion trap, or increased in a particular manner that is sufficient to separate the two ion types. Recalling the earlier discussion regarding Equation 1, it was discussed that an ion with a high m/z ratio will experience a lower overall $V_{trap}$ barrier. Thus, the high mass ion 604 will be ejected beyond the rear pseudo-potential barrier 602 before the low mass ion 603. Once the all the high mass ions 604 have been eluted, the DC gradient voltage 605 can be increased further, such as shown in diagram 630 to elute the remaining ions 603.

Figure 7:
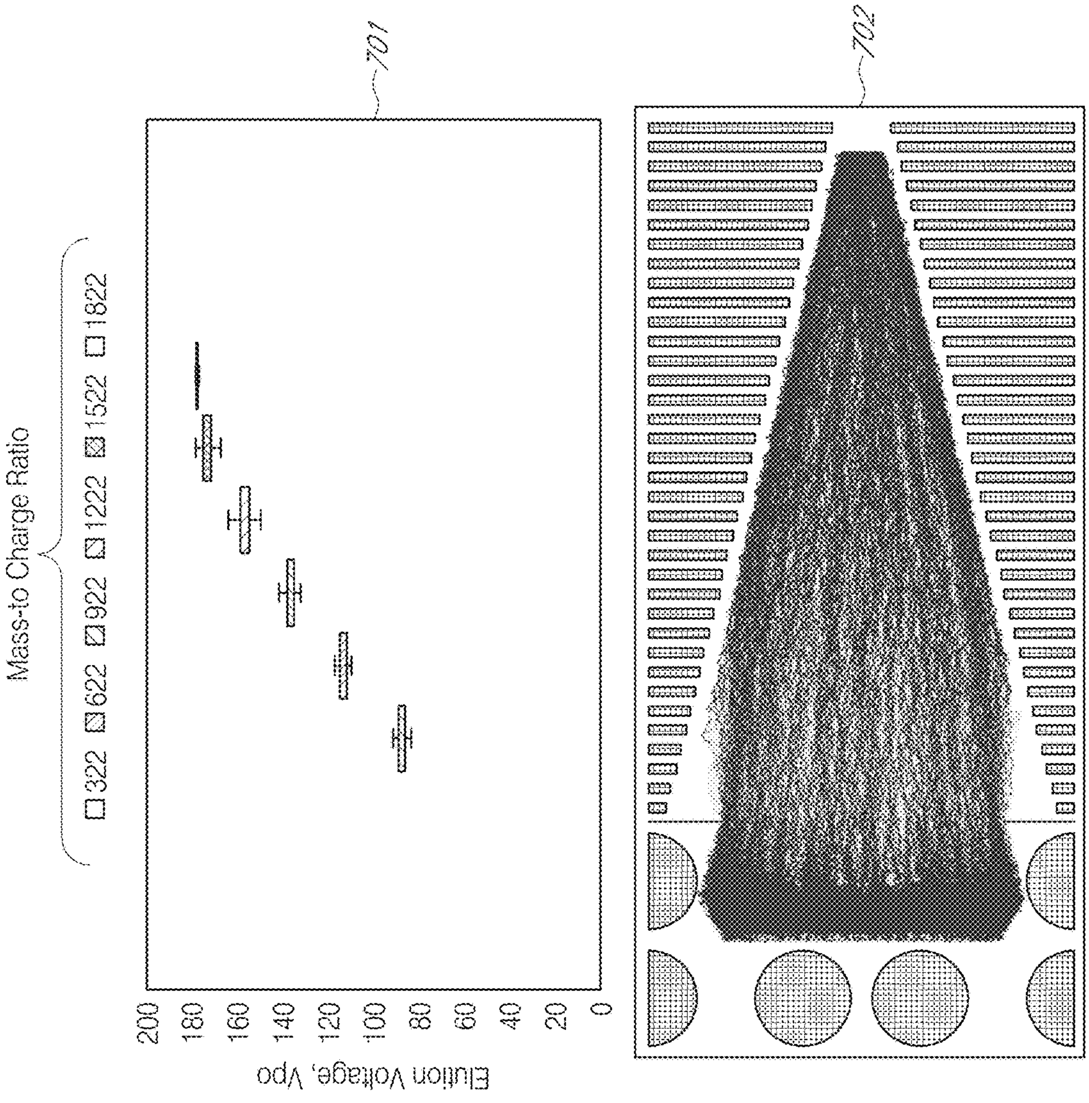
Figure 8A:
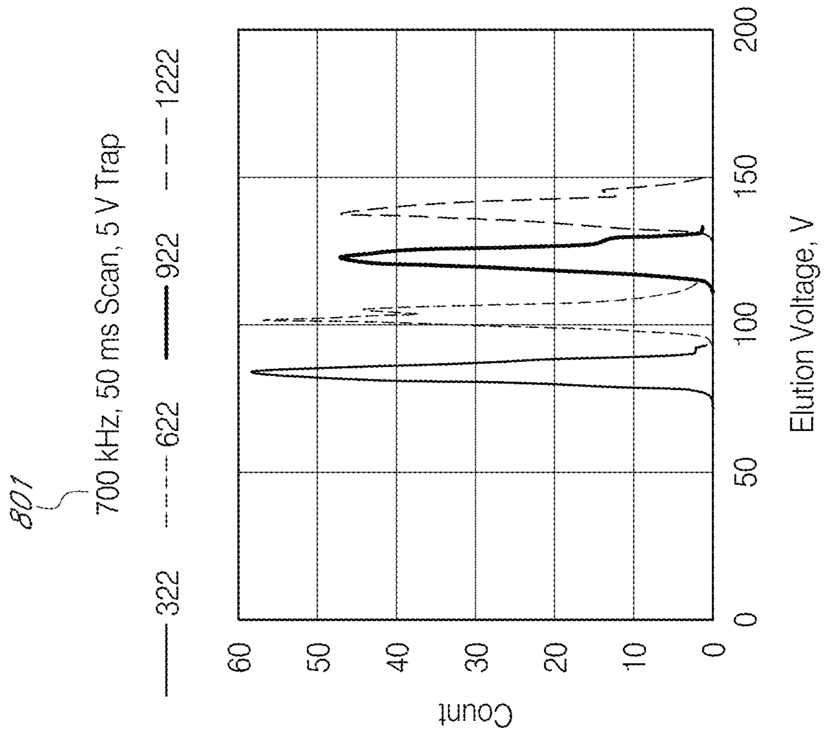
FIGS. 8A through 8D show examples of the operation of the ion trap described herein while varying frequency.
Figure 8B:
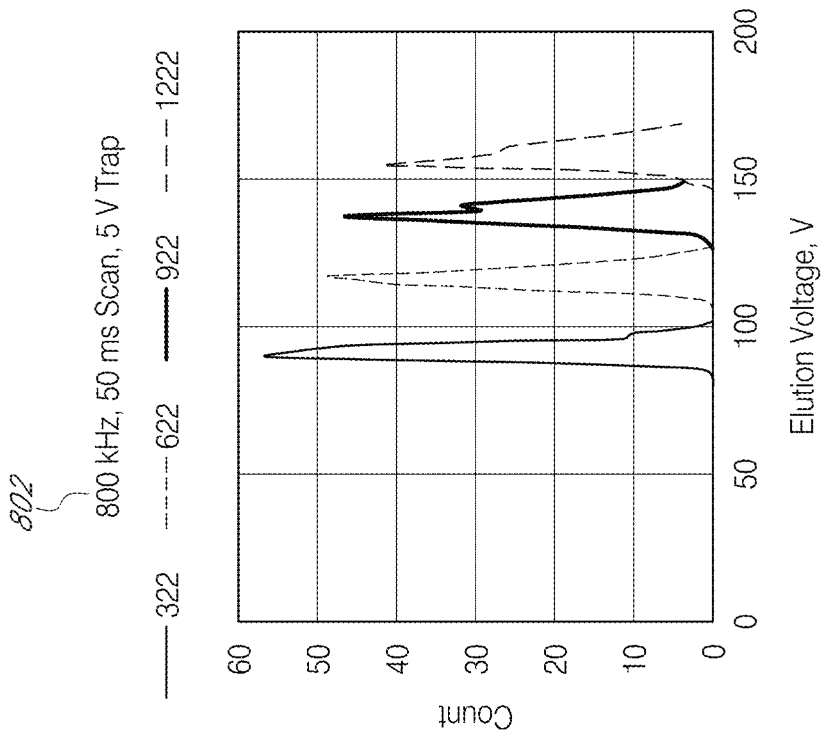
Figure 8C:
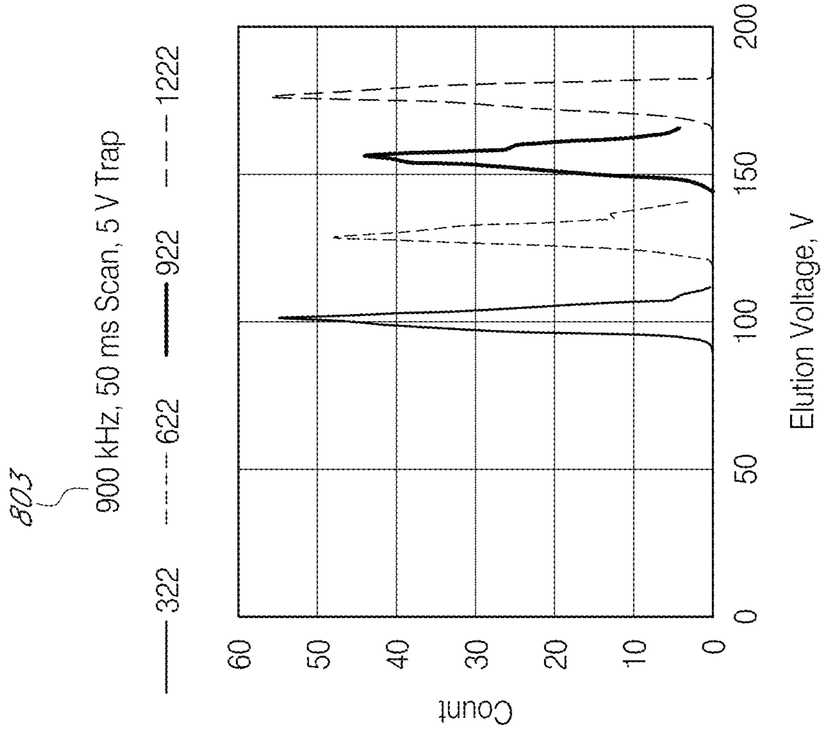
Figure 8D:
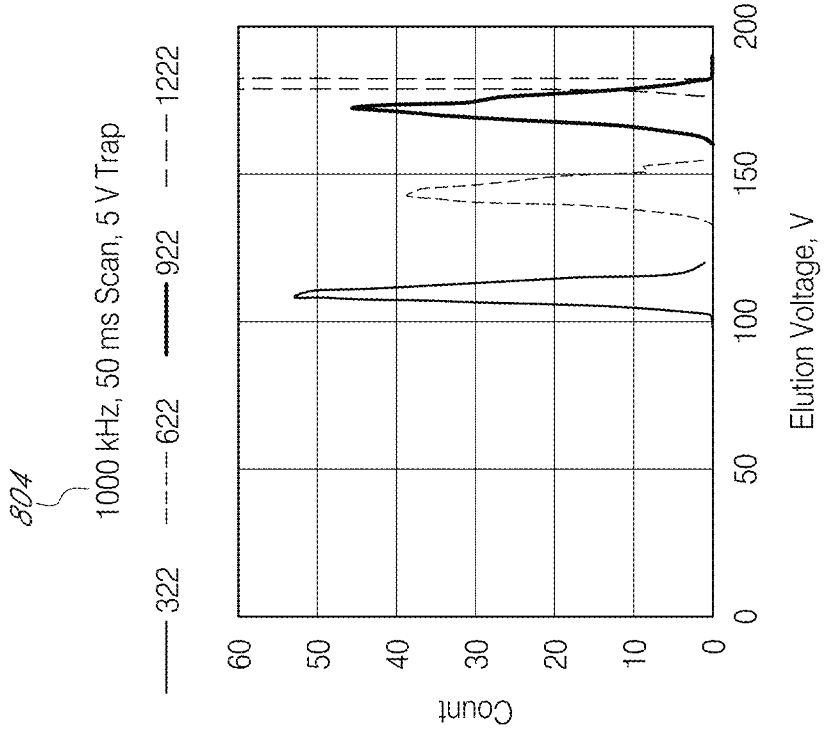
Figure 9B:
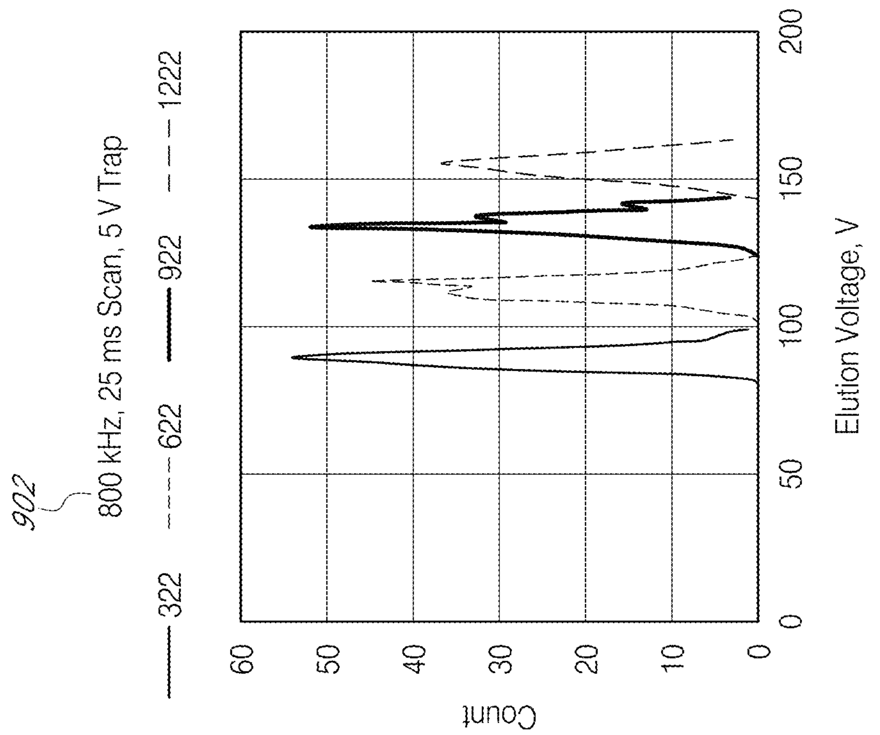
FIGS. 9A through 9D show examples of the operation of the ion trap described herein while varying scan time.
Figure 9A:
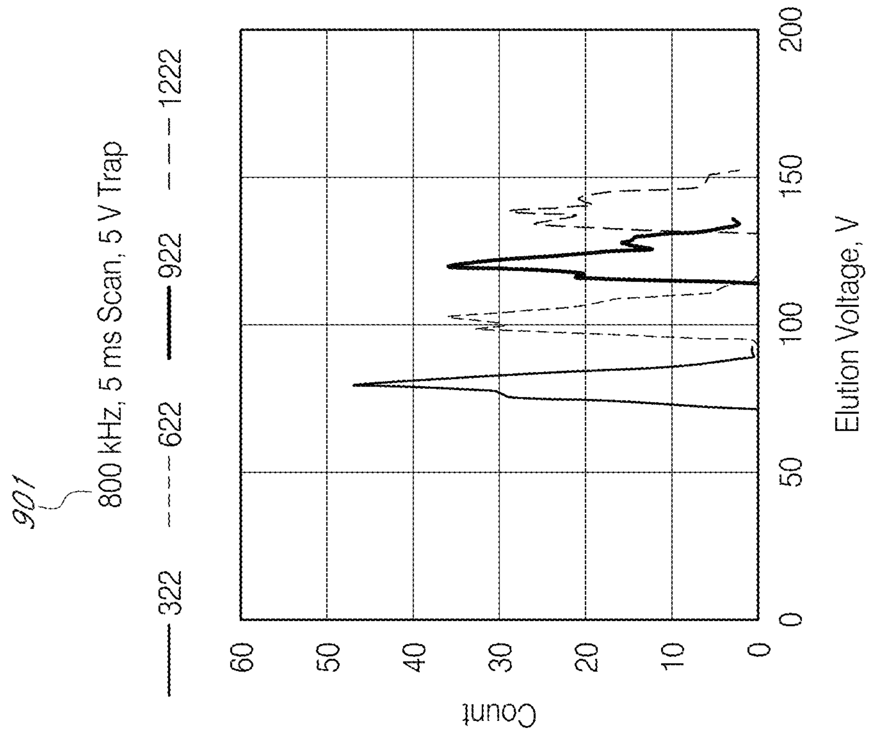
Figure 9D:
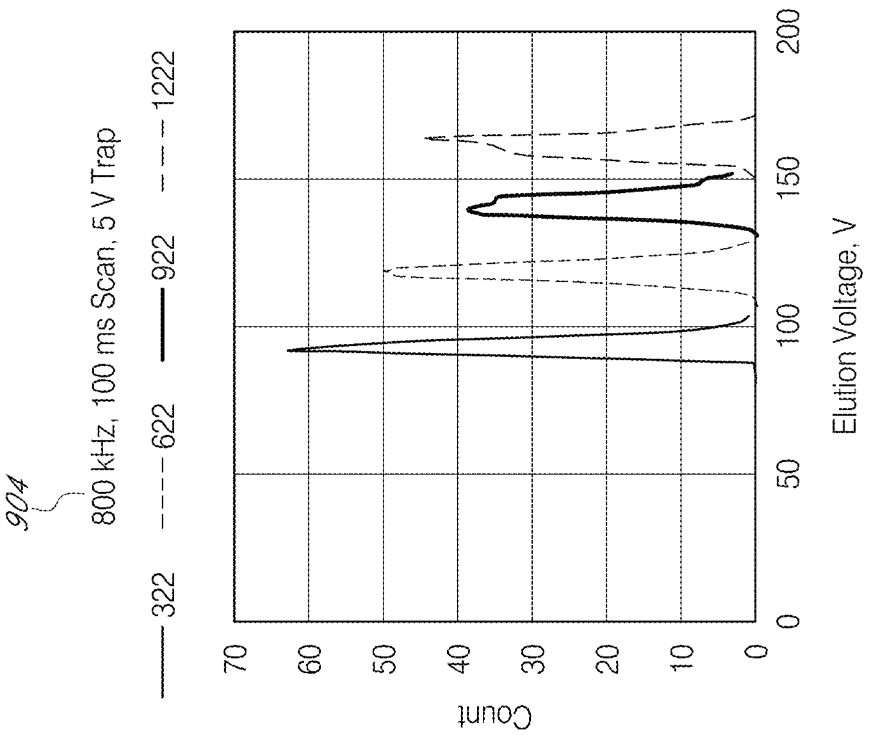
Figure 9C:
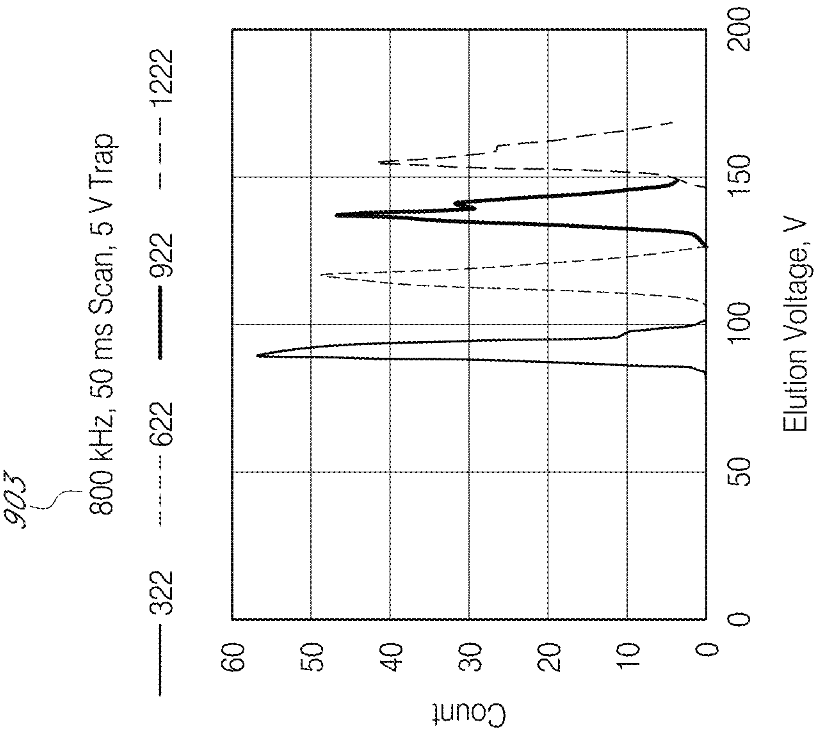
Figure 10B:
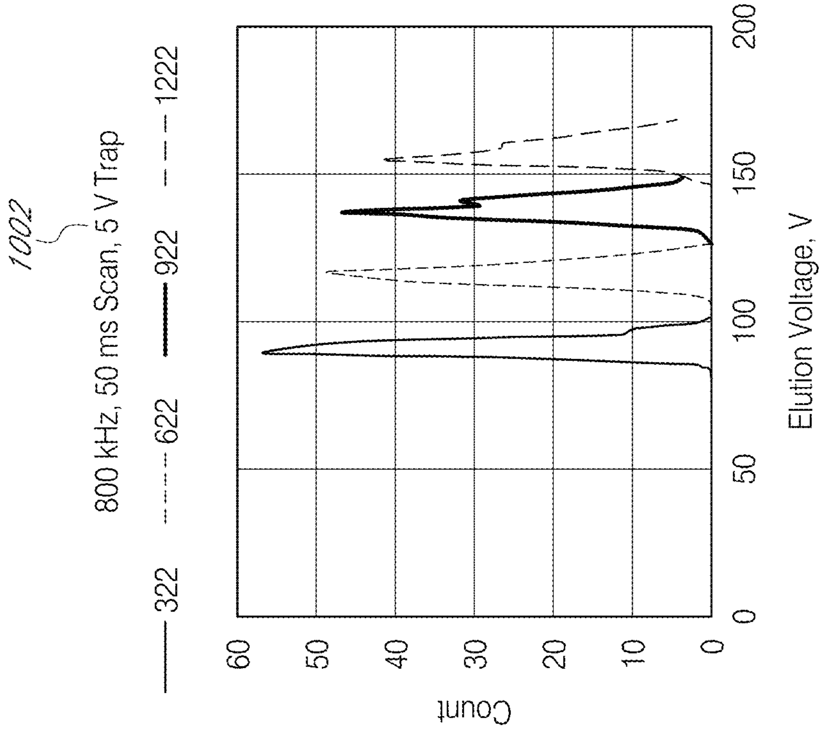
FIGS. 10A through 10D show examples of the operation of the ion trap described herein while varying DC trap voltage.
Figure 10A:
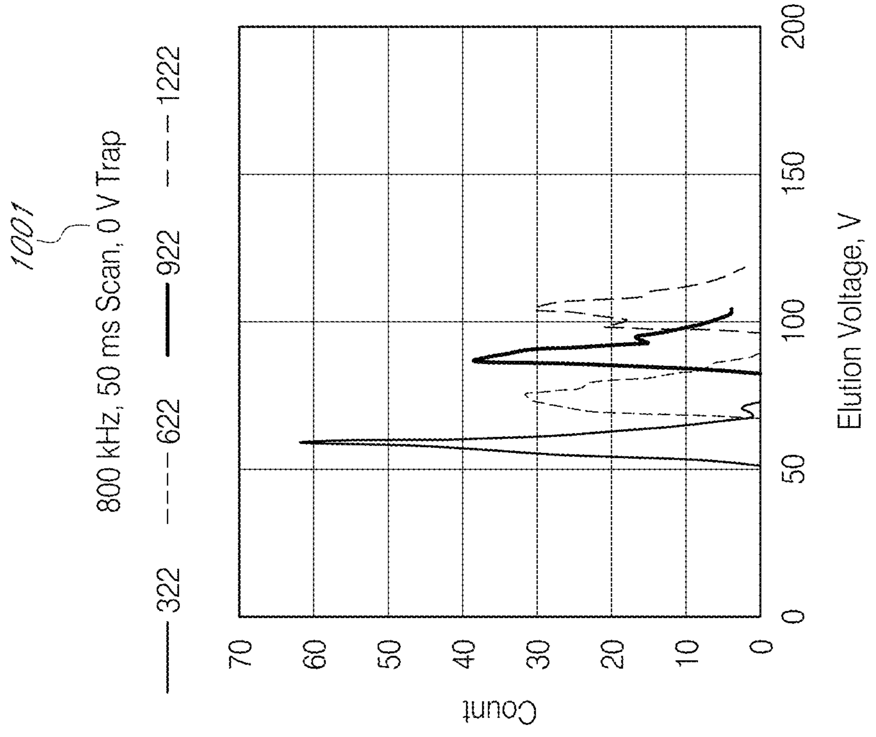
Figure 10C:
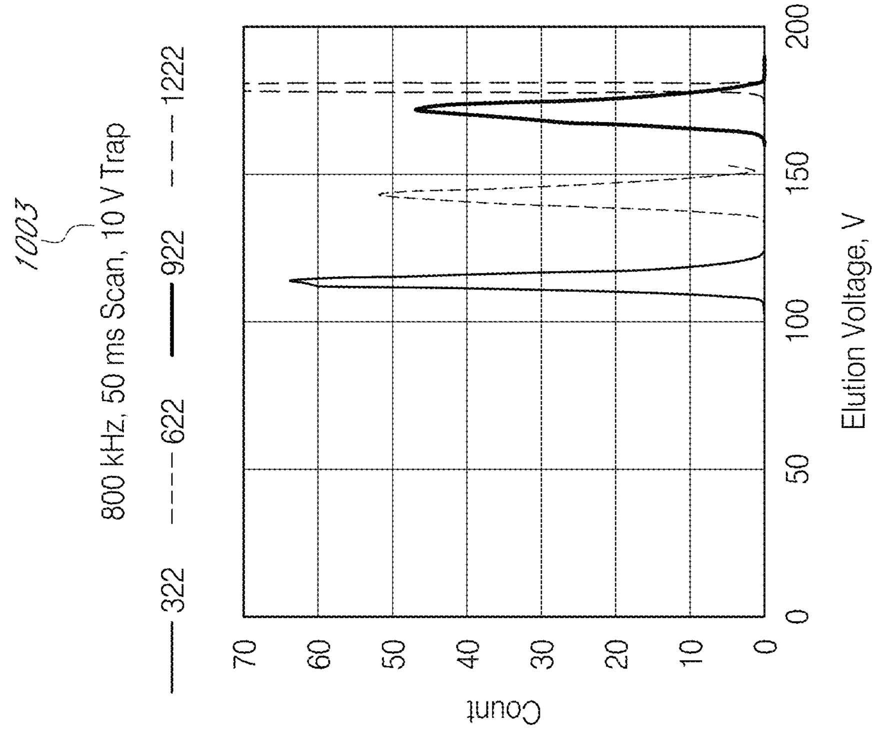
Figure 10D:
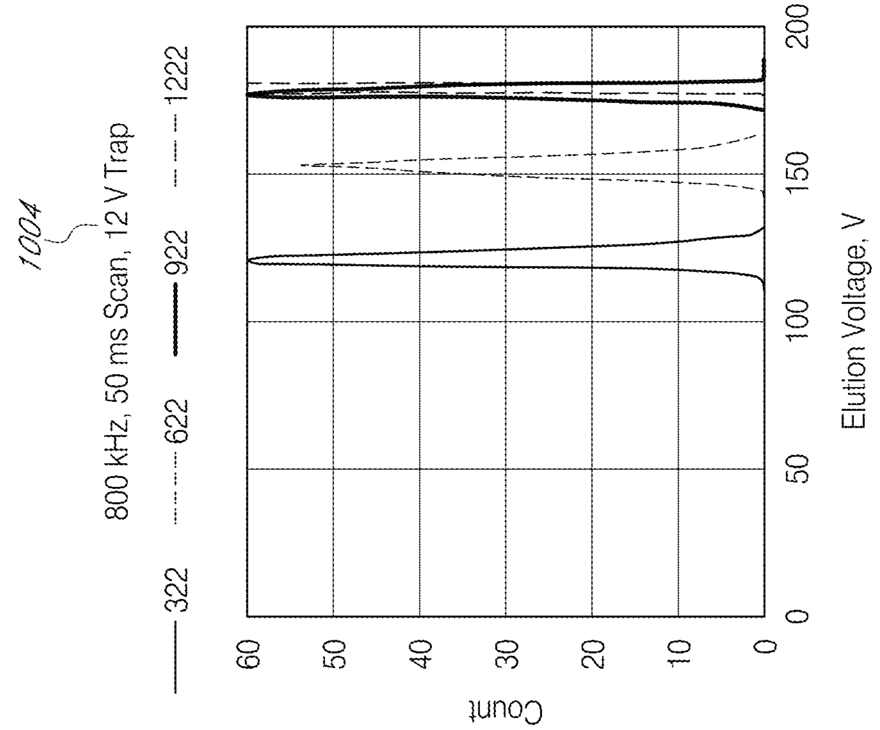

It should be understood that the diagrams shown in FIGS. 6A through 6E are greatly simplified for explanatory purposes. In a practical application, there would be many more ions, and likely many more groups of ions (i.e., ions having similar m/z). Referring briefly to FIG. 7, an example graph of Elution Voltages vs. Mass-to-Charge Ratios 701. Accordingly, in some embodiments, and as shown, ions tend to be eluted in groups, based on their m/z ratio. Also shown in FIG. 7 is a rendering of ion elution paths 702. As can be seen in the rendering 702 an extremely large number of ions were eluted, passed through the ion funnel and into the detector. Returning to FIG. 6, the final diagrams 640 and 650 illustrate a combination of elution methods. Specifically, diagram 650 shows ramping up the DC gradient inside the trap, while also ramping down the RF voltage (e.g., reducing the strength of the pseudo-potential barrier.

In some embodiments, various characteristics of the ion trap (such as shown in rendering 702) may be modified to achieve various different results. For example, in some embodiments, and as shown in FIGS. 8A through 8D, the frequencies (e.g., 801, 802, 803 and 804) of the ion trap may be adjusted according to the analytical need. In this example, the axial field in the trap was kept constant while the RF was scanned from 180 V to 0 V over 50 ms. Thus, as shown, if an embodiment uses a lower frequency (e.g., 700 kHz 801), the ion trap has a strong pseudopotential barrier as well as the ability to trap a wider mass range. Furthermore, as shown in FIG. 8, as the frequency is increased (e.g., 800 kHz, 900 kHz, 1000 kHz, etc.) although the range is decreased, the resolving power is increased.

In addition to the frequency, the scan time characteristic may also be modified (e.g., 901, 902, 903, and 904). Thus, in another embodiment, and as shown in FIGS. 9A through 9D, the scan time may be adjusted (e.g., 5 ms, 25 ms, 50 ms, 100 ms, etc.). In this example, the axial DC field in the trap was kept constant while the RF (800 kHz) was scanned from 180 V to 0 V. As would be expected, as the scan time is increased, the accuracy (i.e., resolving power) increases. In a further embodiment, such as shown in FIGS. 10A through 10D, the voltage drop across the trap (e.g., DC axial field) may be modified (e.g., 1001, 1002, 1003, and 1004). For example, the system may have a 0V, 5V, 10V, or 12V trap voltage. In some embodiments, and as shown, increasing the voltage drop may improve the resolving power but decreases the stable range that can be contained in the trap.

Thus, disclosed herein are system and method for operating and maintaining an ion trap. Referring to FIG. 11, the system may, in some embodiments, apply an RF voltage to a group of multipole electrodes creating a pseudo-potential barrier 1101. The system may then apply a DC voltage creating an axial field in opposition to the pseudo-potential barrier, wherein the pseudo-potential barrier is configured to confine one or more ions in the trap 1102. Once all the ions are inserted into the system (e.g., are contained within the trap), the system may ramp (e.g., raise or lower) the voltage of the RF or DC, thereby causing at least one of the one or more ions to be eluted across the pseudo-potential barrier 1103.

As discussed herein, various ion traps and ion trap methodologies are possible, however, critical to each trap is the use of a DC voltage trap with an RF field. In some embodiments, and as shown in FIG. 12, the elution properties of ions is based on each ion's m/z ratio and mobility dependencies. As the voltage is modified on either the DC or RF fields, the ions elution may change. Referring now to FIG.

12, two plots are shown that illustrate the difference in an elution profile for an RF vs DC scan.

FIGS. 12A and 12B contains two graphical representations showing the difference in elution profile for an RF vs DC scan. Based on the DC scan plot 1210, ion elution times follow a z/m dependence whereas the RF scan plot 1220 shows a m/z dependence with time. However, as can be seen, both voltage scans were simulated to be linear with time. In some embodiments, and as shown in this illustrative example, the DC scan shows far superior resolving power for ions with lower m/z.

Reference will now be made to the listed variables 1211 and 1221 that were used in the traps that created the examples. In some embodiments, and as shown at 1211, the axial DC voltage at the front of the trap goes from 220V to 260V in 10 ms 1212/1213. Alternatively, as shown in 1221, the RF voltage drops from 180 Vpp to 0 Vpp in 10 ms 1222/1223. In a further embodiment, the magnitude of the pressure may also determine whether the ion elution will be influenced by mobility.

Another illustrative embodiment is shown in FIG. 13, in which the axial DC voltage at the front of the trap is ramped from 210 V to 260 V in 10 ms. In some embodiments, and as shown, an ion having m/z of 922 1301 is simulated with 25% higher mobility (e.g., m/z 923 1302) and 25% lower mobility (e.g., m/z 921 1303) than m/z 922 at both 1 and 3 Torr. As shown, at 1 Torr, the mobility dependence may be very small and elution may largely be a function of m/z. However, at 3 Torr, the pseudopotential barrier is dampened by collisions, and thus ions may elute earlier due to a weaker barrier. Moreover, the mobility dependence in elution time is clearly present. This effect is quite significant because mobility-independent elution would allow for such a trapping device to be calibrated with a trap-type mass spectrometer alone. Below are example equations for collisional dampening.

For typical foreline pressures (e.g., ≥1 Torr), $E_{trap}$ is dampened to some extent by a coefficient, y, relative to its strength in vacuum, $E_{trap,vac}$:

$$E_{trap}(m/z) = \gamma E_{trap,vac}(m/z)$$

$$\gamma = \frac{\tau^2\omega^2}{1+\tau^2\omega^2}$$

where:

$$\tau = \frac{mK}{ze}$$

and τ is the relaxation time which is inversely proportional to pressure.

The mass spectrometer support methods disclosed herein may include interactions with a human user (e.g., via the user local computing device 1520 discussed herein with reference to FIG. 15). These interactions may include providing information to the user (e.g., information regarding the operation of a scientific instrument such as the scientific instrument 1510 of FIG. 15, information regarding a sample being analyzed or other test or measurement performed by a scientific instrument, information retrieved from a local or remote database, or other information) or providing an option for a user to input commands (e.g., to control the operation of a scientific instrument such as the scientific instrument 1510 of FIG. 15, or to control the analysis of data generated by a scientific instrument), queries (e.g., to a local or remote database), or other information.

In some embodiments, the interactions with the mass spectrometer system may be performed through a graphical user interface (GUI) that includes a visual display on a display device (e.g., the display device 1410 discussed herein with reference to FIG. 14) that provides outputs to the user and/or prompts the user to provide inputs (e.g., via one or more input devices, such as a keyboard, mouse, trackpad, or touchscreen, included in the other I/O devices 1412 discussed herein with reference to FIG. 14). The mass spectrometer support systems disclosed herein may include any suitable GUIs for interaction with a user.

IV. System Implementation

As noted above, the mass spectrometer platform 100 may be implemented by one or more computing devices. FIG. 15 is a block diagram of a computing device 1400 that may perform some or all of the mass spectrometer support methods disclosed herein, in accordance with various embodiments. In some embodiments, the mass spectrometer platform 100 may be implemented by a single computing device 1400 or by multiple computing devices 1400. Further, as discussed below, a computing device 1400 (or multiple computing devices 1400) that implements the mass spectrometer platform 100 may be part of one or more of the scientific instruments 1510, the user local computing device 1520, the service local computing device 1530, or the remote computing device 1540 of FIG. 15.

The computing device 1400 of FIG. 14 is illustrated as having a number of components, but any one or more of these components may be omitted or duplicated, as suitable for the application and setting. In some embodiments, some or all of the components included in the computing device 1400 may be attached to one or more motherboards and enclosed in a housing (e.g., including plastic, metal, and/or other materials). In some embodiments, some these components may be fabricated onto a single system-on-a-chip (SoC) (e.g., an SoC may include one or more processing devices 1402 and one or more storage devices 1404). Additionally, in various embodiments, the computing device 1400 may not include one or more of the components illustrated in FIG. 14, but may include interface circuitry (not shown) for coupling to the one or more components using any suitable interface (e.g., a Universal Serial Bus (USB) interface, a High-Definition Multimedia Interface (HDMI) interface, a Controller Area Network (CAN) interface, a Serial Peripheral Interface (SPI) interface, an Ethernet interface, a wireless interface, or any other appropriate interface). For example, the computing device 1400 may not include a display device 1410, but may include display device interface circuitry (e.g., a connector and driver circuitry) to which a display device 1410 may be coupled.

The computing device 1400 may include a processing device 1402 (e.g., one or more processing devices). As used herein, the term "processing device" may refer to any device or portion of a device that processes electronic data from registers and/or memory to transform that electronic data into other electronic data that may be stored in registers and/or memory. The processing device 1402 may include one or more digital signal processors (DSPs), application-specific integrated circuits (ASICs), central processing units (CPUs), graphics processing units (GPUs), crypto-processors (specialized processors that execute cryptographic algorithms within hardware), server processors, or any other suitable processing devices.

The computing device 1400 may include a storage device 1404 (e.g., one or more storage devices). The storage device 1404 may include one or more memory devices such as random-access memory (RAM) (e.g., static RAM (SRAM)

devices, magnetic RAM (MRAM) devices, dynamic RAM (DRAM) devices, resistive RAM (RRAM) devices, or conductive-bridging RAM (CBRAM) devices), hard drive-based memory devices, solid-state memory devices, networked drives, cloud drives, or any combination of memory devices. In some embodiments, the storage device 1404 may include memory that shares a die with a processing device 1402. In such an embodiment, the memory may be used as cache memory and may include embedded dynamic random-access memory (eDRAM) or spin transfer torque magnetic random-access memory (STT-MRAM), for example. In some embodiments, the storage device 1404 may include non-transitory computer readable media having instructions thereon that, when executed by one or more processing devices (e.g., the processing device 1402), cause the computing device 1400 to perform any appropriate ones of or portions of the methods disclosed herein.

The computing device 1400 may include an interface device 1406 (e.g., one or more interface devices 1406). The interface device 1406 may include one or more communication chips, connectors, and/or other hardware and software to govern communications between the computing device 1400 and other computing devices. For example, the interface device 1406 may include circuitry for managing wireless communications for the transfer of data to and from the computing device 1400. The term "wireless" and its derivatives may be used to describe circuits, devices, systems, methods, techniques, communications channels, etc., that may communicate data through the use of modulated electromagnetic radiation through a nonsolid medium. The term does not imply that the associated devices do not contain any wires, although in some embodiments they might not. Circuitry included in the interface device 1406 for managing wireless communications may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultra-mobile broadband (UMB) project (also referred to as "3GPP2"), etc.). In some embodiments, circuitry included in the interface device 1406 for managing wireless communications may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. In some embodiments, circuitry included in the interface device 1406 for managing wireless communications may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). In some embodiments, circuitry included in the interface device 1406 for managing wireless communications may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. In some embodiments, the interface device 1406 may include one or more antennas (e.g., one or more antenna arrays) to receipt and/or transmission of wireless communications.

In some embodiments, the interface device 1406 may include circuitry for managing wired communications, such as electrical, optical, or any other suitable communication protocols. For example, the interface device 1406 may include circuitry to support communications in accordance with Ethernet technologies. In some embodiments, the interface device 1406 may support both wireless and wired communication, and/or may support multiple wired communication protocols and/or multiple wireless communication protocols. For example, a first set of circuitry of the interface device 1406 may be dedicated to shorter-range wireless communications such as Wi-Fi or Bluetooth, and a second set of circuitry of the interface device 1406 may be dedicated to longer-range wireless communications such as global positioning system (GPS), EDGE, GPRS, CDMA, WiMAX, LTE, EV-DO, or others. In some embodiments, a first set of circuitry of the interface device 1406 may be dedicated to wireless communications, and a second set of circuitry of the interface device 1406 may be dedicated to wired communications.

The computing device 1400 may include battery/power circuitry 1408. The battery/power circuitry 1408 may include one or more energy storage devices (e.g., batteries or capacitors) and/or circuitry for coupling components of the computing device 1400 to an energy source separate from the computing device 1400 (e.g., AC line power).

The computing device 1400 may include a display device 1410 (e.g., multiple display devices). The display device 1410 may include any visual indicators, such as a heads-up display, a computer monitor, a projector, a touchscreen display, a liquid crystal display (LCD), a light-emitting diode display, or a flat panel display.

The computing device 1400 may include other input/output (I/O) devices 1412. The other I/O devices 1412 may include one or more audio output devices (e.g., speakers, headsets, earbuds, alarms, etc.), one or more audio input devices (e.g., microphones or microphone arrays), location devices (e.g., GPS devices in communication with a satellite-based system to receive a location of the computing device 1400, as known in the art), audio codecs, video codecs, printers, sensors (e.g., thermocouples or other temperature sensors, humidity sensors, pressure sensors, vibration sensors, accelerometers, gyroscopes, etc.), image capture devices such as cameras, keyboards, cursor control devices such as a mouse, a stylus, a trackball, or a touchpad, bar code readers, Quick Response (QR) code readers, or radio frequency identification (RFID) readers, for example.

The computing device 1400 may have any suitable form factor for its application and setting, such as a handheld or mobile computing device (e.g., a cell phone, a smart phone, a mobile internet device, a tablet computer, a laptop computer, a netbook computer, an ultrabook computer, a personal digital assistant (PDA), an ultra-mobile personal computer, etc.), a desktop computing device, or a server computing device or other networked computing component.

One or more computing devices implementing any of the mass spectrometer support modules or methods disclosed herein may be part of a mass spectrometer support system. FIG. 15 is a block diagram of an example mass spectrometer support system 1500 in which some or all of the mass spectrometer support methods disclosed herein may be performed, in accordance with various embodiments. The mass spectrometer support modules and methods disclosed herein (e.g., the mass spectrometer platform 100 of FIG. 1 and the method 800 of FIG. 8) may be implemented by one or more of the scientific instruments 1510, the user local computing device 1520, the service local computing device 1530, or the remote computing device 1540 of the mass spectrometer support system 1500.

Any of the scientific instrument 1510, the user local computing device 1520, the service local computing device 1530, or the remote computing device 1540 may include any of the embodiments of the computing device 1400 discussed herein with reference to FIG. 14, and any of the scientific instrument 1510, the user local computing device 1520, the service local computing device 1530, or the remote computing device 1540 may take the form of any appropriate ones of the embodiments of the computing device 1400 discussed herein with reference to FIG. 14.

The scientific instrument 1510, the user local computing device 1520, the service local computing device 1530, or the remote computing device 1540 may each include a processing device 1502, a storage device 1504, and an interface device 1506. The processing device 1502 may take any suitable form, including the form of any of the processing devices 1402 discussed herein with reference to FIG. 14, and the processing devices 1502 included in different ones of the scientific instrument 1510, the user local computing device 1520, the service local computing device 1530, or the remote computing device 1540 may take the same form or different forms. The storage device 1504 may take any suitable form, including the form of any of the storage devices 1404 discussed herein with reference to FIG. 14, and the storage devices 1504 included in different ones of the scientific instrument 1510, the user local computing device 1520, the service local computing device 1530, or the remote computing device 1540 may take the same form or different forms. The interface device 1506 may take any suitable form, including the form of any of the interface devices 1406 discussed herein with reference to FIG. 14, and the interface devices 1506 included in different ones of the scientific instrument 1510, the user local computing device 1520, the service local computing device 1530, or the remote computing device 1540 may take the same form or different forms.

The scientific instrument 1510, the user local computing device 1520, the service local computing device 1530, and the remote computing device 1540 may be in communication with other elements of the mass spectrometer support system 1500 via communication pathways 1508. The communication pathways 1508 may communicatively couple the interface devices 1506 of different ones of the elements of the mass spectrometer support system 1500, as shown, and may be wired or wireless communication pathways (e.g., in accordance with any of the communication techniques discussed herein with reference to the interface devices 1406 of the computing device 1400 of FIG. 14). The particular mass spectrometer support system 1500 depicted in FIG. 15 includes communication pathways between each pair of the scientific instrument 1510, the user local computing device 1520, the service local computing device 1530, and the remote computing device 1540, but this "fully connected" implementation is simply illustrative, and in various embodiments, various ones of the communication pathways 1508 may be absent. For example, in some embodiments, a service local computing device 1530 may not have a direct communication pathway 1508 between its interface device 1506 and the interface device 1506 of the scientific instrument 1510, but may instead communicate with the scientific instrument 1510 via the communication pathway 1508 between the service local computing device 1530 and the user local computing device 1520 and the communication pathway 1508 between the user local computing device 1520 and the scientific instrument 1510.

The scientific instrument 1510 may include any appropriate scientific instrument, such as a gas chromatography mass spectrometer (GC-MS), a liquid chromatography mass spectrometer (LC-MS), ion chromatography mass spectrometer (IC-MS), or the like.

The user local computing device 1520 may be a computing device (e.g., in accordance with any of the embodiments of the computing device 1400 discussed herein) that is local to a user of the scientific instrument 1510. In some embodiments, the user local computing device 1520 may also be local to the scientific instrument 1510, but this need not be the case; for example, a user local computing device 1520 that is in a user's home or office may be remote from, but in communication with, the scientific instrument 1510 so that the user may use the user local computing device 1520 to control and/or access data from the scientific instrument 1510. In some embodiments, the user local computing device 1520 may be a laptop, smartphone, or tablet device. In some embodiments the user local computing device 1520 may be a portable computing device.

The service local computing device 1530 may be a computing device (e.g., in accordance with any of the embodiments of the computing device 1400 discussed herein) that is local to an entity that services the scientific instrument 1510. For example, the service local computing device 1530 may be local to a manufacturer of the scientific instrument 1510 or to a third-party service company. In some embodiments, the service local computing device 1530 may communicate with the scientific instrument 1510, the user local computing device 1520, and/or the remote computing device 1540 (e.g., via a direct communication pathway 1508 or via multiple "indirect" communication pathways 1508, as discussed above) to receive data regarding the operation of the scientific instrument 1510, the user local computing device 1520, and/or the remote computing device 1540 (e.g., the results of self-tests of the scientific instrument 1510, calibration coefficients used by the scientific instrument 1510, the measurements of sensors associated with the scientific instrument 1510, etc.). In some embodiments, the service local computing device 1530 may communicate with the scientific instrument 1510, the user local computing device 1520, and/or the remote computing device 1540 (e.g., via a direct communication pathway 1508 or via multiple "indirect" communication pathways 1508, as discussed above) to transmit data to the scientific instrument 1510, the user local computing device 1520, and/or the remote computing device 1540 (e.g., to update programmed instructions, such as firmware, in the scientific instrument 1510, to initiate the performance of test or calibration sequences in the scientific instrument 1510, to update programmed instructions, such as software, in the user local computing device 1520 or the remote computing device 1540, etc.). A user of the scientific instrument 1510 may utilize the scientific instrument 1510 or the user local computing device 1520 to communicate with the service local computing device 1530 to report a problem with the scientific instrument 1510 or the user local computing device 1520, to request a visit from a technician to improve the operation of the scientific instrument 1510, to order consumables or replacement parts associated with the scientific instrument 1510, or for other purposes.

The remote computing device 1540 may be a computing device (e.g., in accordance with any of the embodiments of the computing device 1400 discussed herein) that is remote from the scientific instrument 1510 and/or from the user local computing device 1520. In some embodiments, the remote computing device 1540 may be included in a datacenter or other large-scale server environment. In some embodiments, the remote computing device 1540 may include network-attached storage (e.g., as part of the storage device 1504). The remote computing device 1540 may store data generated by the scientific instrument 1510, perform analyses of the data generated by the scientific instrument 1510 (e.g., in accordance with programmed instructions), facilitate communication between the user local computing device 1520 and the scientific instrument 1510, and/or facilitate communication between the service local computing device 1530 and the scientific instrument 1510.

In some embodiments, one or more of the elements of the mass spectrometer support system 1500 illustrated in FIG. 15 may not be present. Further, in some embodiments, multiple ones of various ones of the elements of the mass spectrometer support system 1500 of FIG. 15 may be present. For example, a mass spectrometer support system 1500 may include multiple user local computing devices 1520 (e.g., different user local computing devices 1520 associated with different users or in different locations). In another example, a mass spectrometer support system 1500 may include multiple scientific instruments 1510, all in communication with service local computing device 1530 and/or a remote computing device 1540; in such an embodiment, the service local computing device 1530 may monitor these multiple scientific instruments 1510, and the service local computing device 1530 may cause updates or other information may be "broadcast" to multiple scientific instruments 1510 at the same time. Different ones of the scientific instruments 1510 in a mass spectrometer support system 1500 may be located close to one another (e.g., in the same room) or farther from one another (e.g., on different floors of a building, in different buildings, in different cities, etc.). In some embodiments, a scientific instrument 1510 may be connected to an Internet-of-Things (IoT) stack that allows for command and control of the scientific instrument 1510 through a web-based application, a virtual or augmented reality application, a mobile application, and/or a desktop application. Any of these applications may be accessed by a user operating the user local computing device 1520 in communication with the scientific instrument 1510 by the intervening remote computing device 1540. In some embodiments, a scientific instrument 1510 may be sold by the manufacturer along with one or more associated user local computing devices 1520 as part of a local scientific instrument computing unit 1512.

In some embodiments, different ones of the scientific instruments 1510 included in a mass spectrometer support system 1500 may be different types of scientific instruments 1510. In some such embodiments, the remote computing device 1540 and/or the user local computing device 1520 may combine data from different types of scientific instruments 1510 included in a mass spectrometer support system 1500.

What is claimed is:

1. A system for sorting ions comprising:

a group of multipole electrodes configured to form an ion trap, wherein the group of multipole electrodes comprise a group of quadrupole electrodes, wherein the group of quadrupole electrodes comprise:

a first inner electrode and a first outer electrode, and a second inner electrode and a second outer electrode;

an ion guide adjacent to the second inner electrode and the second outer electrode; and a RF and DC voltage device configured to apply a first RF voltage to the first inner electrode and the first outer electrode creating a first pseudo-potential barrier disposed between the first inner electrode and the first outer electrode, a second RF voltage to the second inner electrode and the second outer electrode creating a second pseudo-potential barrier disposed between the second inner electrode and the second outer electrode, and apply a DC voltage creating an axial field in opposition to the first pseudo-potential barrier or the second pseudopotential barrier, wherein the first pseudo-potential barrier and the second pseudo-potential barrier are each independently configured to confine one or more ions in an annulus disposed between the first inner electrode, the first outer electrode, the second inner electrode, and the second outer electrode; and wherein ramping at least one of the first RF voltage, second RF voltage, DC voltage, or a combination thereof causes at least one of the one or more ions to be eluted across the second pseudo-potential barrier, wherein the ion guide is an ion funnel.

2. The system of claim 1, wherein the group of quadrupole electrodes are configured to provide a quadrupolar potential.

3. The system of claim 1, wherein eluting at least one of the one or more ions across the second pseudo-potential barrier further comprises increasing the axial DC field to initiate axial stratification in the ion trap and elute the ions across the second pseudo-potential barrier based substantially on their mass-to-charge ratio.

4. The system of claim 1, wherein ramping the second RF voltage involves decreasing the second RF voltage to initiate axial stratification in the ion trap and elute the ions across the second pseudo-potential barrier based on their mass-to-charge ratio.

5. The system of claim 1, wherein eluting at least one of the one or more ions across the second pseudo-potential barrier further comprises floating the ion trap with respect to an entrance potential of the ion guide to elute the ions across the second pseudo-potential barrier based on their mass-to-charge ratio.

6. The system of claim 1, wherein eluting at least one of the one or more ions across the second pseudo-potential barrier further comprises at least one of:

increasing the DC voltage and decreasing the second RF voltage;

increasing the DC voltage and floating the ion trap with respect to the ion guide;

decreasing the second RF voltage and floating the ion trap with respect to the ion guide; or increasing the DC voltage, decreasing the second RF voltage applied to the group of electrodes, and floating the ion trap with respect to the ion guide.

7. The system of claim 1, wherein the ions are substantially unconfined or unrestrained in a tangential direction which is orthogonal both to a radial direction and to a longitudinal axis of the ion guide or ion trap.

8. The system of claim 1, wherein the system operates between 1 mTorr and 5 Torr.

9. The system of claim 1, wherein the RF voltage has a frequency selected from the group consisting of: (i) <100 kHz; (ii) 100-200 kHz; (iii) 200-300 kHz; (iv) 300-400 kHz; (v) 400-500 kHz; (vi) 0.5-1.0 MHz; (vii) 1.0-1.5 MHz; (viii) 1.5-2.0 MHz; (ix) 2.0-2.5 MHz; (x) 2.5-3.0 MHz; (xi) 3.0-3.5 MHz; (xii) 3.5-4.0 MHz; (xiii) 4.0-4.5 MHz; (xiv) 4.5-5.0 MHz; (xv) 5.0-5.5 MHz; (xvi) 5.5-6.0 MHz; (xvii) 6.0-6.5 MHz; (xviii) 6.5-7.0 MHz; (xix) 7.0-7.5 MHz; (xx) 7.5-8.0 MHz; (xxi) 8.0-8.5 MHz; (xxii) 8.5-9.0 MHz; (xxiii) 9.0-9.5 MHz; (xxiv) 9.5-10.0 MHz; and (xxv) >10.0 MHz; and (b) the RF voltage has an amplitude selected from the group consisting of: (i) <50 V peak to peak; (ii) 50-100

V peak to peak; (iii) 100-150 V peak to peak; (iv) 150-200 V peak to peak; (v) 200-300 V peak to peak; (vi) 300-400 V peak to peak; (vii) 400-500 V peak to peak; (viii) 500-600 V peak to peak; (ix) 600-700 V peak to peak; (x) 700-800 V peak to peak; (xi) 800-900 V peak to peak; (xii) 900-1000 V peak to peak; (xiii) 1000-1100 V peak to peak; (xiv) 1100-1200 V peak to peak; (xv) 1200-1300 V peak to peak; (xvi) 1300-1400 V peak to peak; (xvii) 1400-1500 V peak to peak; and (xviii) >1500 V peak to peak.

10. A method for sorting ions comprising:

applying, using a RF and DC voltage device, a first RF voltage to a first inner electrode and a first outer electrode of a group of multipole electrodes creating a first pseudo-potential barrier disposed between the first inner electrode and the first outer electrode;

applying, using the RF and DC voltage device, a second RF voltage to a second inner electrode and a second outer electrode of the group of multipole electrodes creating a second pseudo-potential barrier disposed between the second inner electrode and the second outer electrode;

applying, using the RF and DC voltage device, a DC voltage creating an axial field in opposition to the first pseudo-potential barrier or the second pseudo-potential barrier, wherein the first pseudo-potential barrier and the second pseudo-potential barrier are independently configured to confine one or more ions in an annulus disposed between the first inner electrode, the first outer electrode, the second inner electrode, and the second outer electrode; and ramping at least one of the first RF voltage, second RF voltage, DC voltage, or a combination thereof causing at least one of the one or more ions to be eluted across the second pseudo-potential barrier to an ion guide adjacent to the group of multipole electrodes, wherein the ion guide is an ion funnel.

11. The method of claim 10, wherein the group of multipole electrodes comprise a group of quadrupole electrodes configured to provide a quadrupolar potential.

12. The method of claim 10, wherein eluting at least one of the one or more ions across the second pseudo-potential barrier further comprises increasing the axial field to initiate axial stratification in the ion trap and elute the ions across the second pseudo-potential barrier based on their mass-to-charge ratio.

13. The method of claim 10, wherein ramping the second RF voltage involves decreasing the second RF voltage applied to the group of electrodes to initiate axial stratification in the ion trap and elute the ions across the second pseudo-potential barrier based on their mass-to-charge ratio.

14. The method of claim 10, wherein eluting at least one of the one or more ions across the second pseudo-potential barrier further comprises floating the ion trap with respect to an entrance potential of the ion guide to elute the ions across the second pseudo-potential barrier based on their mass-to-charge ratio.

15. The method of claim 10, wherein eluting at least one of the one or more ions across the pseudo-potential barrier further comprises at least one of:

increasing the DC voltage and decreasing the second RF voltage;

increasing the DC voltage and floating the ion trap with respect to the ion guide;

decreasing the second RF voltage and floating the ion trap with respect to the ion guide; or increasing the DC voltage, decreasing the second RF voltage, and floating the ion trap with respect to the ion guide.

16. The method of claim 10, wherein the ions are substantially unconfined or unrestrained in a tangential direction which is orthogonal both to a radial direction and to a longitudinal axis of the ion guide or ion trap.

17. The method of claim 10, wherein the system operates between 1 mTorr and 5 Torr.

18. The method of claim 10, wherein the RF voltage has a frequency selected from the group consisting of: (i) <100 kHz; (ii) 100-200 kHz; (iii) 200-300 kHz; (iv) 300-400 kHz; (v) 400-500 kHz; (vi) 0.5-1.0 MHz; (vii) 1.0-1.5 MHz; (viii) 1.5-2.0 MHz; (ix) 2.0-2.5 MHz; (x) 2.5-3.0 MHz; (xi) 3.0-3.5 MHz; (xii) 3.5-4.0 MHz; (xiii) 4.0-4.5 MHz; (xiv) 4.5-5.0 MHz; (xv) 5.0-5.5 MHz; (xvi) 5.5-6.0 MHz; (xvii) 6.0-6.5 MHz; (xviii) 6.5-7.0 MHz; (xix) 7.0-7.5 MHz; (xx) 7.5-8.0 MHz; (xxi) 8.0-8.5 MHz; (xxii) 8.5-9.0 MHz; (xxiii) 9.0-9.5 MHz; (xxiv) 9.5-10.0 MHz; and (xxv) >10.0 MHz; and (b) the RF voltage has an amplitude selected from the group consisting of: (i) <50 V peak to peak; (ii) 50-100 V peak to peak; (iii) 100-150 V peak to peak; (iv) 150-200 V peak to peak; (v) 200-300 V peak to peak; (vi) 300-400 V peak to peak; (vii) 400-500 V peak to peak; (viii) 500-600 V peak to peak; (ix) 600-700 V peak to peak; (x) 700-800 V peak to peak; (xi) 800-900 V peak to peak; (xii) 900-1000 V peak to peak; (xiii) 1000-1100 V peak to peak; (xiv) 1100-1200 V peak to peak; (xv) 1200-1300 V peak to peak; (xvi) 1300-1400 V peak to peak; (xvii) 1400-1500 V peak to peak; and (xviii) >1500 V peak to peak.

* * * * *